US007142230B2

United States Patent
Novak et al.

(10) Patent No.: US 7,142,230 B2
(45) Date of Patent: Nov. 28, 2006

(54) SYSTEM AND METHOD FOR SCREENING INCOMING AND OUTGOING VIDEO COMMUNICATIONS WITHIN AN INTERACTIVE TELEVISION SYSTEM

(75) Inventors: Robert E. Novak, Kirkland, WA (US); James A. Billmaier, Woodinville, WA (US); Anthony F. Istvan, Snoqualmie, WA (US)

(73) Assignee: Digeo, Inc., Kirkland, WA (US)

( * ) Notice: Subject to any disclaimer, the term of this patent is extended or adjusted under 35 U.S.C. 154(b) by 1047 days.

(21) Appl. No.: 09/935,195

(22) Filed: Aug. 22, 2001

(65) Prior Publication Data
US 2003/0041326 A1   Feb. 27, 2003

(51) Int. Cl.
*H04N 7/14* (2006.01)

(52) U.S. Cl. .................. 348/14.01; 379/93.21

(58) Field of Classification Search ............ 348/14.01, 348/14.03–14.07, 14.12; 379/90.01, 93.01, 379/93.17, 93.23, 142.01, 142.04–142.06, 379/124.16, 188, 199, 200, 210.02, 210.03, 379/196, 354
See application file for complete search history.

(56) References Cited

U.S. PATENT DOCUMENTS

| 5,473,671 | A | | 12/1995 | Partridge, III ............... 379/59 |
|---|---|---|---|---|
| 5,559,868 | A | | 9/1996 | Blonder ........................ 379/96 |
| H1714 | H | | 3/1998 | Partridge, III ............... 348/14 |
| 5,754,641 | A | * | 5/1998 | Voit et al. .................... 379/354 |
| 5,907,604 | A | | 5/1999 | Hsu ........................... 379/142 |
| 5,974,133 | A | * | 10/1999 | Fleischer et al. ........... 379/196 |
| 5,995,603 | A | | 11/1999 | Anderson .................... 379/142 |
| 5,999,207 | A | | 12/1999 | Rodriguez et al. ............ 348/14 |
| 6,141,058 | A | | 10/2000 | Lagoni et al. ............... 348/563 |
| 6,219,793 | B1 | | 4/2001 | Li et al. ...................... 713/202 |
| 6,259,779 | B1 | | 7/2001 | Council et al. ............. 379/121 |
| 6,463,276 | B1 | * | 10/2002 | Jonsson ....................... 455/410 |
| 2002/0181683 | A1 | | 12/2002 | Mani ..................... 379/201.01 |

* cited by examiner

*Primary Examiner*—Stella Woo
(74) *Attorney, Agent, or Firm*—Kory D. Christensen; Stoel Rives, LLP

(57) ABSTRACT

Outgoing video communication requests are intercepted and screened by one or more unauthorized recipient lists, authorized recipient lists, caller-specific authorized/unauthorized recipient lists, and/or various combinations of these. The video communication requests may be blocked or forwarded to the recipient depending on whether the recipient is included or not included in one of the various lists. Third parties may also be prompted to accept or reject the video communication requests.

46 Claims, 21 Drawing Sheets

Unauthorized Caller List 406

| Name | Reason | Address |
|---|---|---|
| Brad Smith | Convicted of a felony | 2.4.2.1 |
| Julie Hendricks | In argument with our Family | 5.2.3.8 |
| Mark Williams | Has not returned borrowed tool | 4.1.5.8 |
| ... | ... | ... |

1202, 1204, 1206

Authorized Caller List 502

| Name | Reason | Address |
|---|---|---|
| John Doe | Auto mechanic | 45.28.4.8 |
| Bert Abrahms | Relative | 2.5.3.7 |
| Jack North | Son's soccer coach | 5.5.8.2 |
| ... | ... | ... |

Son #1's Unauthorized Caller List
604

| Name | Reason | Address |
|---|---|---|
| Frank Jones | Ex-spouse | 2.4.2.1 |
| James Baker | Juvenile delinquent | 5.2.3.8 |
| Randy Strong | School yard bully | 4.1.5.8 |
| ... | ... | ... |

SYSTEM AND METHOD FOR SCREENING INCOMING AND OUTGOING VIDEO COMMUNICATIONS WITHIN AN INTERACTIVE TELEVISION SYSTEM

BACKGROUND

1. Field of the Invention

The present invention relates generally to the field of interactive television systems. More specifically, the present invention relates to a system and method for screening incoming and outgoing video communications within an interactive television system.

2. Description of Related Background Art

In recent years, a growing number of personal computers and interactive television systems are equipped with digital video cameras. As such, two-way video communication, or "videoconferencing", is increasing in popularity. Videoconferencing offers a new dimension to traditional electronic communication, allowing participants to convey information more rapidly and completely than ever before.

Unfortunately, new technology often results in new abuses. As videoconferencing offers a greater degree of intimacy than traditional audio-only communication, it has an increased capacity for misuse by irresponsible persons. For instance, some users may transmit lewd and/or offensive images through the video medium. Additionally, because videoconferencing is typically two-way, it may attract stalkers, pedophiles, and others with criminal intentions.

Thus, parents and other responsible parties have an increased burden to protect their children by monitoring and filtering video communications. However, no system and method currently exists for comprehensively safeguarding children and the like from the potential abuses of videoconferencing.

BRIEF DESCRIPTION OF THE DRAWINGS

Non-exhaustive embodiments of the invention are described with reference to the figures, in which:

FIG. 12 illustrates an unauthorized caller list and an authorized caller list;

FIG. 13 illustrates a recipient-specific unauthorized caller list;

DETAILED DESCRIPTION OF THE PREFERRED EMBODIMENTS

Figure 1:
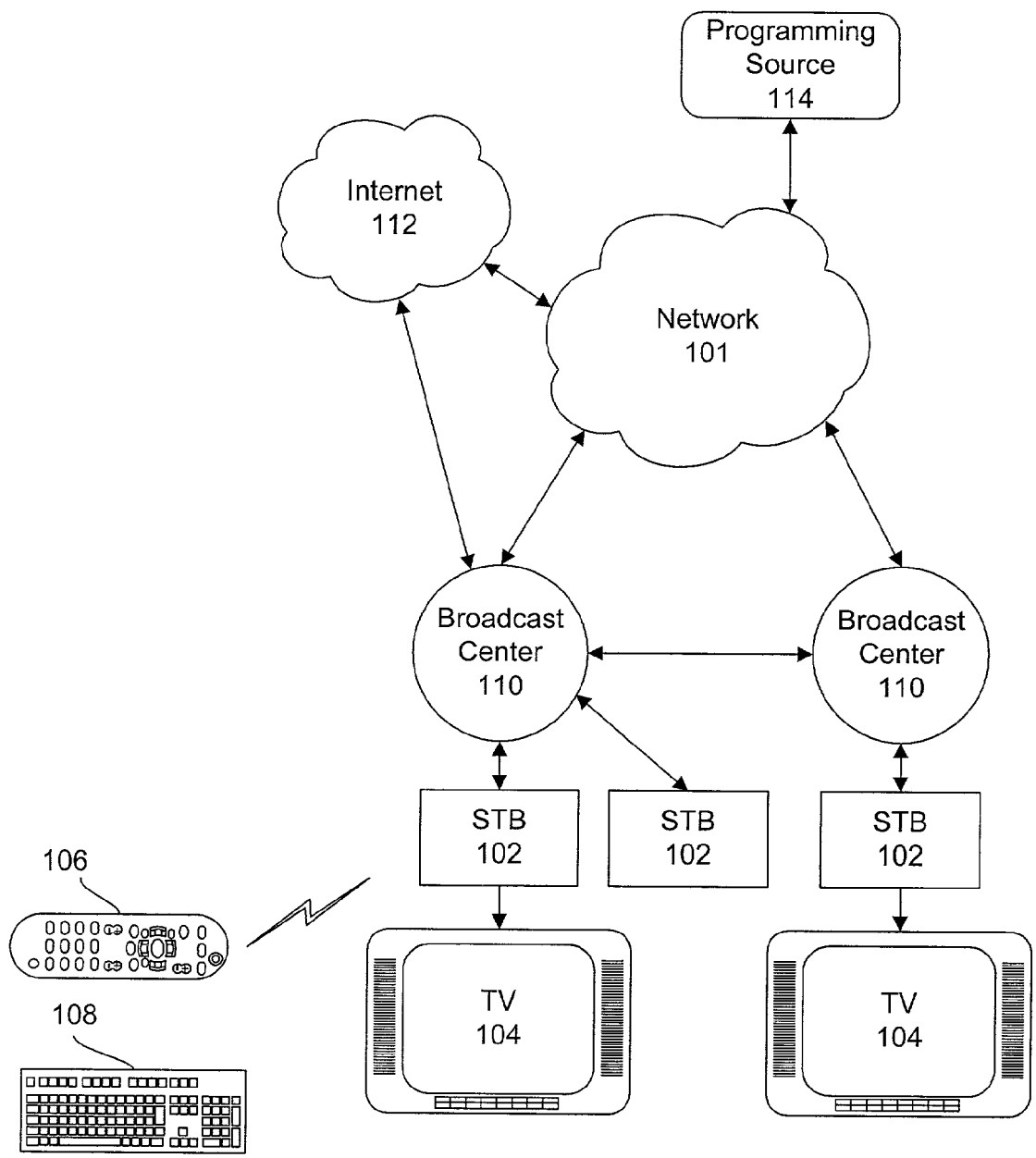
FIG. 1 is a block diagram of a system for two-way video communication.

The present invention solves the foregoing problems and disadvantages by providing a system and method for screening incoming and outgoing video communications within an interactive television system.

In one embodiment, a video communication request is sent from a caller to a recipient (i.e. from a caller's system to a recipient's system). The identity of the caller, which may be obtained from the request, is compared with those in an unauthorized caller list. If a match is found, the video communication request is rejected by default. Recipients on the unauthorized caller list may include, for example, previously offensive callers, callers known to be convicted felons, and the like. If no match is found, the video communication request may be accepted by default, subject to acceptance by the recipient. Rejected video communication requests may be recorded in a log for later review by the intended recipient or a parent or responsible party.

In an alternative embodiment, the caller's identity may be compared with those in an authorized caller list. In this embodiment, the video communication request may be accepted only if the caller's identity is included within the authorized caller list. All other video communication requests may be rejected by default. This allows a parent or responsible party to limit video communications to a set of pre-screened individuals, which also has the effect of screening out video communication requests from telemarketers and other unknown parties.

In the above-described embodiments, screening may occur within a set top box (STB) used by the recipient. In an alternative embodiment, screening may occur at an intermediate node of a communications network linking STBs associated with the caller and the recipient.

In one implementation, the unauthorized caller list and/or the authorized caller list may be recipient-specific. Recipient-specific lists operate like the general lists described above, but are applicable only to a particular recipient. Furthermore, recipient-specific lists may be combined, in certain embodiments, with general authorized/unauthorized caller lists, allowing a parent or guardian to specify, for example, restricted callers for the family, as well as restricted callers for individual family members.

In yet another embodiment, the video communication request is intercepted and a third party (e.g., parent or responsible person) is prompted to accept or reject the request. The third party may be provided with the identities of the caller and the recipient to assist in the determination.

If the third party accepts the request, the communication may be allowed to proceed; otherwise, the request is rejected.

When a third party rejects a request, the identity of the caller may be added to a general or recipient-specific unauthorized caller list. Alternatively, when the third party accepts a request, the identity of the caller may be added to a general or recipient-specific authorized caller list.

In some cases, the third party may be at a remote location when the video communication request is received. For example, a parent may be at work while the request is received by a home STB. Accordingly, the third party may be prompted to accept or reject the communication at a remote location.

In certain embodiments, temporary video communication may be established between the caller and the third party to allow the third party to inquire as to the nature and purpose of the communication. Similarly, the request may include live video from the caller to assist the third party in making a determination. Where live video from the caller is not available, or where the caller is not willing or able to establish two-way video communication with the third party, the request may be rejected by default.

Third-party screening may be combined with screening using an authorized caller list, an unauthorized caller list, and/or recipient-specific authorized/unauthorized caller lists. For example, callers not found on an unauthorized caller list may not be automatically rejected. Instead, a third party may be prompted to accept or reject the caller.

In one embodiment, where a caller listed in an unauthorized caller list makes repeated attempts to contact a recipient, a notification may be automatically sent to a law enforcement agency. The notification may identify the caller as well as other details concerning the unwanted video communication requests.

In one implementation, outgoing video communication requests are also screened using similar techniques. For example, the identity of the recipient may be obtained and compared with those in an unauthorized recipient list, similar to the unauthorized caller list described above. If the recipient is found in the unauthorized recipient list, the request may be blocked by default (e.g., not forwarded to the recipient). Alternatively, if the recipient is not found in the list, the request may be forwarded to the recipient for rejection or acceptance.

Various other lists may be provided, such as authorized recipient lists, which are used in the same manner as the authorized caller lists previously described. Any of these lists may be caller-specific, to allow different lists for different callers. Also, third-party screening may be provided for outgoing video calls in the same manner that third-party screening is provided for incoming calls.

Thus, a system and method in accordance with the present invention allows users to adopt the latest video communications capabilities of modern video communication systems without fear of exposing their households or offices to the increased dangers associated with videoconferencing.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The following discussion makes particular reference to videoconferencing. However, those skilled in the art recognize that videoconferencing typically involves two-way audio communication. Thus, where components for video communication are specifically illustrated, components for audio communication may also be included.

Referring now to FIG. 1, there is shown a system 100 for enabling two-way video communication. In one implementation, the system 100 uses a broadband network 101 for communication, such as a cable network or a direct satellite broadcast (DBS) network.

In one configuration, the system 100 includes a plurality of set top boxes (STBs) 102 located, for instance, at customer homes or offices. Generally, an STB 102 is a consumer electronics device that serves as a gateway between a customer's television 104 and the network 101. In alternative embodiments, an STB 102 may be embodied more generally as a personal computer (PC), an advanced television 104 with STB functionality, or another type of client terminal.

An STB 102 receives encoded television signals and other information from the network 101 and decodes the same for display on the television 104 or other display device (such as a computer monitor, flat panel display, or the like). As its name implies, an STB 102 is typically located on top of, or in close proximity to, the television 104.

Each STB 102 may be distinguished from other network components by a unique identifier, number, code, or address, examples of which include an Internet Protocol (IP) address (such as an IPv6 address), a Media Access Control (MAC) address, or the like. Thus, video streams and other information may be transmitted from the network 101 to a specific STB 102 by specifying the corresponding address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as a wired or wireless mouse (not shown).

Additionally, a keyboard 108 (either wireless or wired) is provided, in one embodiment, to allow a user to rapidly enter text information into the STB 102. Such text information may be used for e-mail, instant messaging (e.g. text-based chat), or the like. In various embodiments, the keyboard 108 may use infrared (IR), radio frequency (RF), or other wireless technologies to transmit keystroke data to the STB 102.

Each STB 102 may be coupled to the network 101 via a broadcast center 110. In the context of a cable network, a broadcast center 110 may be embodied as a head-end, which is generally a centrally-located facility within a community where television programming is received from a local cable TV satellite downlink or other source and packaged together for transmission to customer homes. In one configuration, a head-end also functions as a Central Office (CO) in the telephone industry, routing video streams and other data to and from the various STBs 102 serviced thereby.

A broadcast center 110 may also be embodied as a satellite broadcast center within a direct broadcast satellite (DBS) system. A DBS system may utilize a small 18-inch satellite dish (which is an antenna for receiving a satellite broadcast signal). Each STB 102 may be integrated with a digital integrated receiver/decoder (IRD), which separates each channel, and decompresses and translates the digital signal from the satellite dish to be displayed by the television 104.

Programming for a DBS system may be distributed, for example, by multiple high-power satellites in geosynchronous orbit, each with multiple transponders. Compression (e.g., MPEG) is used to increase the amount of programming that can be transmitted in the available bandwidth.

The broadcast centers 110 may be used to gather programming content, ensure its digital quality, and transmit the signal up to the satellites. Programming may come to the broadcast centers 110 from content providers (CNN, ESPN, HBO, TBS, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some programs may be recorded on digital videotape in the broadcast center 110 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 101, the broadcast centers 110 may be coupled directly to one another or through the network 101. In alternative embodiments, broadcast centers 110 may be connected via a separate network, one particular example of which is the Internet 112. The Internet 112 is a "network of networks" and is well known to those skilled in the art. Communication over the Internet 112 is accomplished using standard protocols, such as TCP/IP (Transmission Control Protocol/Internet Protocol) and the like.

A broadcast center 110 may receive television programming for distribution to the STBs 102 from one or more television programming sources 114 coupled to the network 101. Preferably, television programs are distributed in an encoded format, such as MPEG (Moving Picture Experts Group). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG.

Broadcast centers 110 may enable audio and video communications between STBs 102. Transmission between broadcast centers 110 may occur (i) via a direct peer-to-peer connection between broadcast centers 110, (ii) upstream from a first broadcast center 110 to the network 101 and then downstream to a second broadcast center 110, or (iii) via the Internet 112. For instance, a first STB 102 may send a video transmission upstream to a first broadcast center 110, then to a second broadcast center 110, and finally downstream to a second STB 102.

Figure 2:
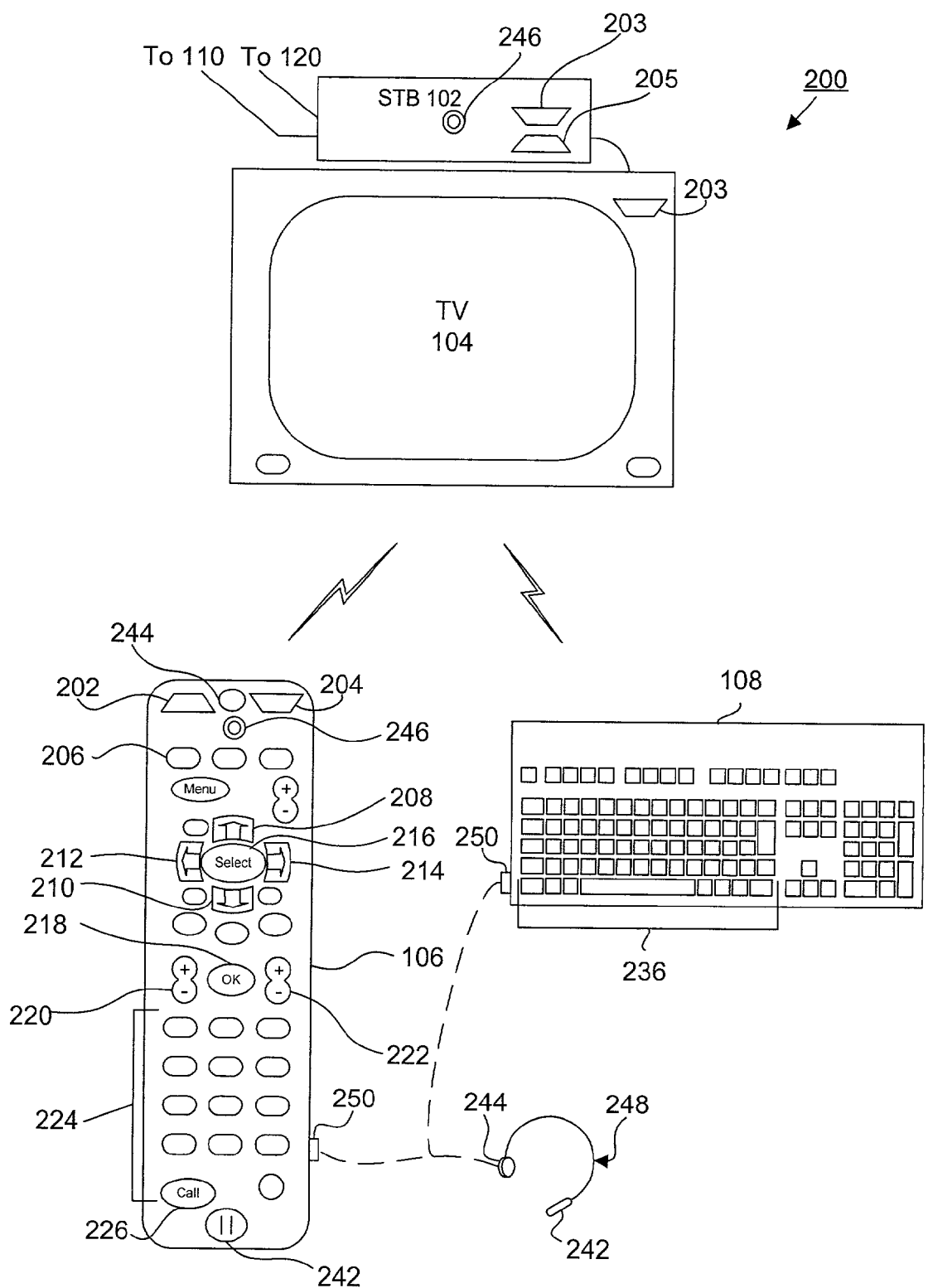
FIG. 2 is an illustration of an interactive television system.

Referring now to FIG. 2, there is shown an interactive television (ITV) system 200 according to an embodiment of the invention. As depicted, the system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting control signals (and possibly audio/video data) to a wireless receiver 203 within the STB 102 and/or the television 104. In certain embodiments, the remote control 106 also includes a wireless receiver 204 for receiving signals from a wireless transmitter 205 within the STB 102.

In one implementation, the wireless transmitters 202, 205 and receivers 203, 204, are configured to use radio frequency (RF) signals. In other embodiments, infrared (IR) or other frequencies along the electromagnetic spectrum may be used. Operational details regarding the wireless transmitters 202, 205 and receivers 203, 204 are generally well known to those of skill in the art.

The remote control 106 preferably includes a number of buttons or other similar controls. For instance, the remote control 106 may include a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, a "Call" button 226, and the like.

In one embodiment, the remote control 106 includes a microphone 242 for capturing an audio signal. The captured audio signal is preferably transmitted to the STB 102 via the wireless transmitter 202. In addition, the remote control 106 may include a speaker 244 for generating audible output from an audio signal received from the STB 102 via the wireless receiver 204. Of course, in alternative embodiments, the microphone 242 and speaker 244 may be integrated with the STB 102.

In certain embodiments, the remote control 106 includes a video camera 246, such as a CCD (charge-coupled device) digital video camera. The video camera 246 allows a user to capture and send video signals to the STB 102. For example, the video camera 246 may capture images of the user. In one implementation, the video camera 246 is in electrical communication with the wireless transmitter 202 for sending the captured video signal to the STB 102. Like the microphone 242 and speaker 244, the video camera 246 may be integrated with the STB 102 in other embodiments.

The various components of the remote control 106 may be positioned in different locations for functionality and ergonomics. For example, as shown in FIG. 2, the speaker 244 may be positioned near the "top" of the remote control 106 (when viewed from the perspective of FIG. 2) and the microphone 242 may be positioned at the "bottom" of the remote control 106. Thus, in one embodiment, a user may conveniently position the speaker 244 near the user's ear and the microphone 242 near the user's mouth in order to operate the remote control 106 in the manner of a telephone.

Alternatively, or in addition, a hands-free headset 248 may be coupled to the remote control 106 or keyboard 108. The headset 248 may be coupled using a standard headset jack 250. The headset 248 may include a microphone 242 and/or speaker 244. Such a headset 248 may be used to reduce audio interference from the television 104 (improving audio quality) and to provide the convenience of hands-free operation.

The optional keyboard 108 facilitates rapid composition of text messages. The keyboard 108 includes a plurality of standard alphanumeric keys 236. In one configuration, the keyboard 108 includes a wireless transmitter 202, similar or identical to the wireless transmitter 202 of the remote control 106. The wireless transmitter 202 transmits keystroke data from the keyboard 108 to the STB 102. Additionally, the keyboard 108 may include one or more of the buttons illustrated on the remote control 106.

Figure 3:
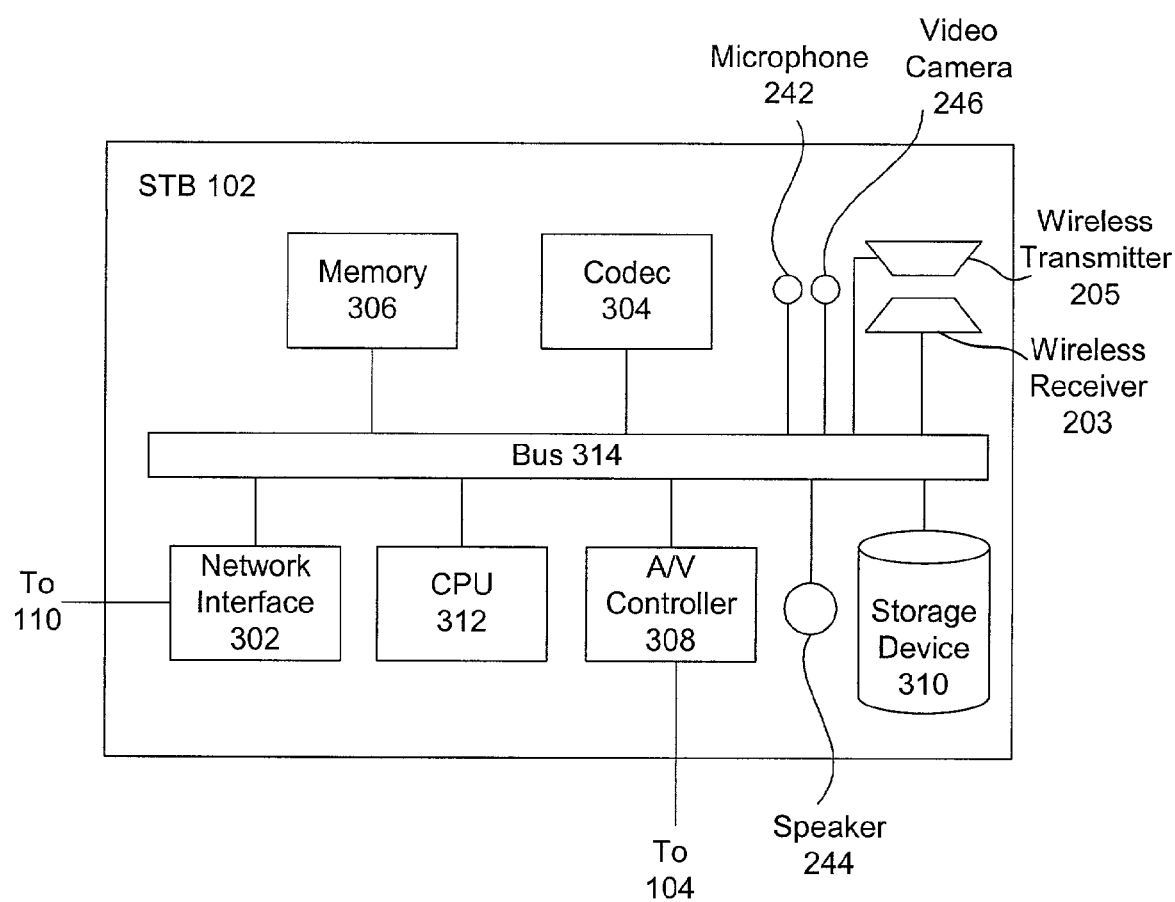
FIG. 3 is a block diagram of physical components of a set top box (STB)

Referring now to FIG. 3, there is shown a block diagram of physical components of an STB 102 according to an embodiment of the invention. As noted above, the STB 102 includes a wireless receiver 203 and a wireless transmitter 205 for receiving/transmitting control signals from/to the remote control 106.

The STB 102 also includes, in one implementation, a network interface 302 for communicating with the network 101 via the broadcast center 110. The interface 302 may include conventional circuitry for receiving, demodulating, and demultiplexing MPEG (Moving Picture Experts Group) packets. The interface 302 may also include conventional cable modem circuitry for sending or receiving data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 also preferably includes a codec (encoder/decoder) 304, which serves to encode audio/video signals into a network-compatible data stream for transmission over the network 101. The codec 304 also serves to decode a network-compatible data stream received from the network 101. The codec 304 may be implemented in hardware and/or software. Moreover, the codec 304 may use various algorithms, such as MPEG or Voice over IP (VoIP), for encoding and decoding.

The STB 102 further includes a memory device 306, such as a random access memory (RAM), for storing temporary data. Similarly, a read-only memory (ROM) may be provided for storing more permanent data, such as fixed code and configuration information.

In one embodiment, an audio/video (A/V) controller 308 is provided for converting digital audio/video signals into analog signals for playback/display on the television 104. The A/V controller 308 may be implemented using one or more physical devices, such as a separate graphics and sound controllers. The A/V controller 308 may include graphics hardware for performing bit-block transfers (bit-blits) and other graphical operations for displaying a graphical user interface (GUI) on the television 104.

In some implementations, the STB 102 may include a storage device 310, such as a hard disk drive or the like. The storage device 310 may be configured to store encoded television broadcasts and retrieve the same at a later time for display. The storage device 310 may be configured, in one embodiment, as a digital video recorder (DVR), enabling scheduled recording of television programs, pausing (buffering) live video, etc.

The storage device 310 may also be used in various embodiments to store viewer preferences, parental lock settings, electronic program guide (EPG) data, passwords, e-mail messages, and the like. In one implementation, the storage device 310 also stores an operating system (OS) for the STB 102, such as Windows CE® or Linux®.

As noted above, the STB 102 may include, in certain embodiments, a microphone 242 and a speaker 244 for capturing and reproducing audio signals, respectively. The STB 102 may also include a video camera 246 for capturing video signals. These components may be included in lieu of or in addition to similar components in the remote control 106, keyboard 108, and/or television 104.

A CPU 312 controls the operation of the STB 102, including the other components thereof, which are coupled to the CPU 312 in one embodiment via a bus 314. The CPU 312 may be embodied as a microprocessor, a microcontroller, a digital signal processor (DSP) or other device known in the art. As noted above, the CPU 312 may perform logical and arithmetic operations based on program code stored within the memory 306 or the storage device 310.

Of course, FIG. 3 illustrates only one possible configuration of an STB 102. Those skilled in the art will recognize that various other architectures and components may be provided within the scope of the invention. In addition, various standard components are not illustrated in order to avoid obscuring aspects of the invention.

FIGS. 4–9 are high-level dataflow diagrams illustrating operations and transactions according to several embodiments of the invention. Of course, the illustrated embodiments may be combined in various ways without departing from the spirit and scope of the invention.

Figure 4:
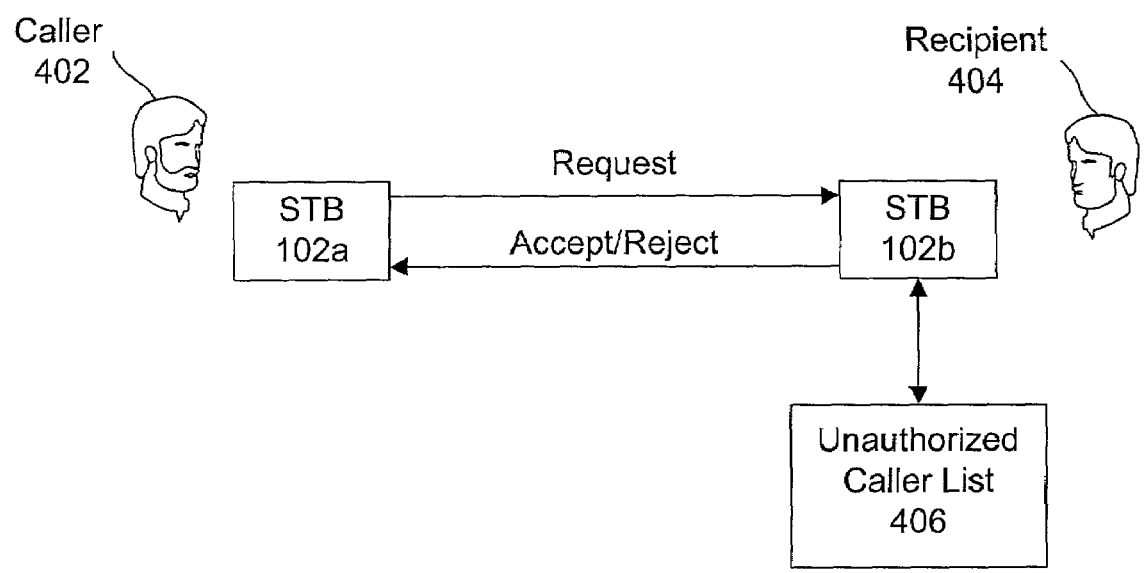
FIG. 4 is a dataflow diagram of a first embodiment of the invention.

As shown in FIG. 4, a caller 402 at a first STB 102a may attempt to establish video communication with a recipient 404 at a second STB 102b. Of course, those skilled in the art will recognize that other devices may be used for video communication, such as video phones, PDAs, personal computers, and the like.

In one embodiment, the caller's STB 102a sends a video communication request to the recipient's STB 102b. The precise format of the request is not crucial to the invention and will vary depending on the particular hardware and software being used. Typically, however, the request will identify the caller 402 and the recipient 404, e.g., by name, network address, or the like. In essence, the request is an invitation to the recipient 404 to establish video communication with the caller 402.

In one embodiment, the request is intercepted by the recipient's STB 102b before the recipient 404 is notified of the request or before two-way video communication is established. Thereafter, the caller's identity is determined from information contained within the request. For example, the caller's name or network address may be extracted from the request.

As used herein, the terms "caller 402" and "recipient 404" are synonymous with "the caller's identity" and the "recipient's identity", respectively. The terms "caller 402" and "STB 102a" may also be synonymous, where a request only identifies a caller 402 by the name or address of the STB 102a.

After the caller 402 is identified, the STB 102b determines whether the caller 402 (i.e. the caller's identity) is included within an unauthorized caller list 406. In one embodiment, the unauthorized caller list 406 is a list of callers 402 who are not allowed to communicate with the recipient 404 and/or other users of the STB 102b. The unauthorized caller list 406 may contain, for example, previously offensive callers 406, callers 406 who are known felons, etc.

If the caller 402 is in the unauthorized caller list 406, the video communication request may be rejected by default. If the caller 402 is not in the unauthorized caller list 406, the video communication request may be accepted, subject, of course, to acceptance by the recipient 404.

In some cases, the caller 402 or the caller's STB 102a may not be identified by the request. For example, a caller 402 may configure the STB 102a to mask his or her identity. Where the caller 402 or the caller's STB 102a is not identifiable, the request is automatically rejected in one embodiment, since the STB 102b is not capable of determining whether the caller 402 is a threat to the recipient 404.

Preferably, the unauthorized caller list 406 is administered by a parent or other responsible party. The recipient's STB 102b may provide an interface for adding, deleting, or modifying the callers 402 included in the unauthorized caller list 406. Security measures (e.g., passwords) may be provided to limit access to the unauthorized caller list 406 to the parent or other responsible party.

Based on the foregoing, the unauthorized caller list 406 provides an effective mechanism for screening a video communication request. Video communication requests from parties known to be potentially threatening to the recipient 404 may be automatically blocked by including those parties in the unauthorized caller list 406.

Figure 5:
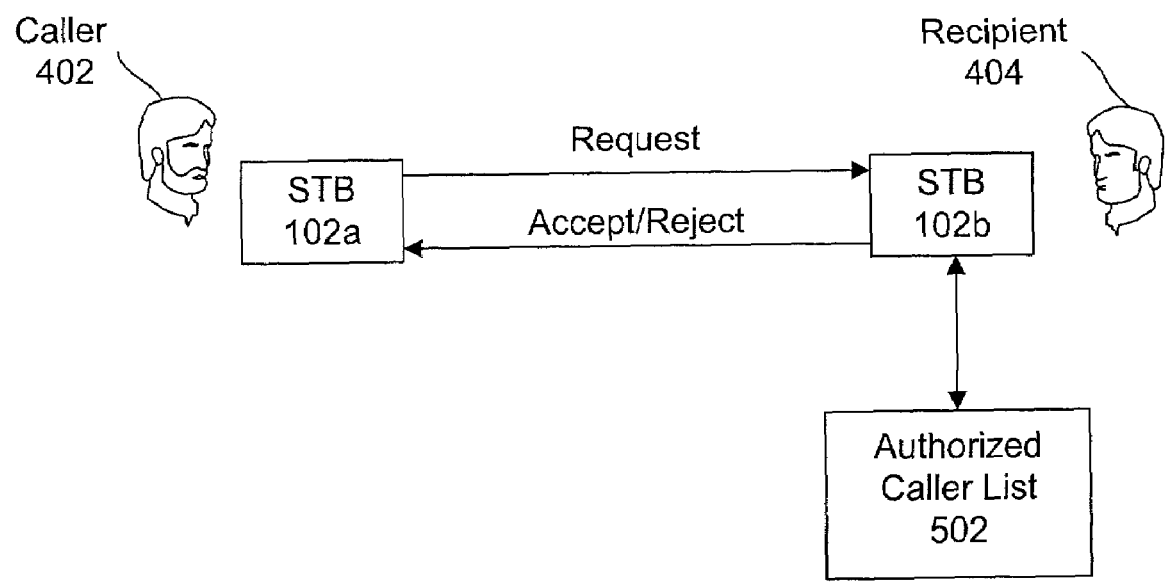
FIG. 5 is a dataflow diagram of a second embodiment of the invention.

In an alternative embodiment, as shown in FIG. 5, the recipient's STB 102b may include an authorized caller list 502, which is a list of pre-screened callers 402 who are permitted to contact the recipient 404. An authorized caller list 502 is more restrictive than an unauthorized caller list 406, since a request may be accepted only if the caller 402 is contained within the list 502. This has the effect of screening out requests from unknown parties, such as telemarketers and the like.

Figure 6:
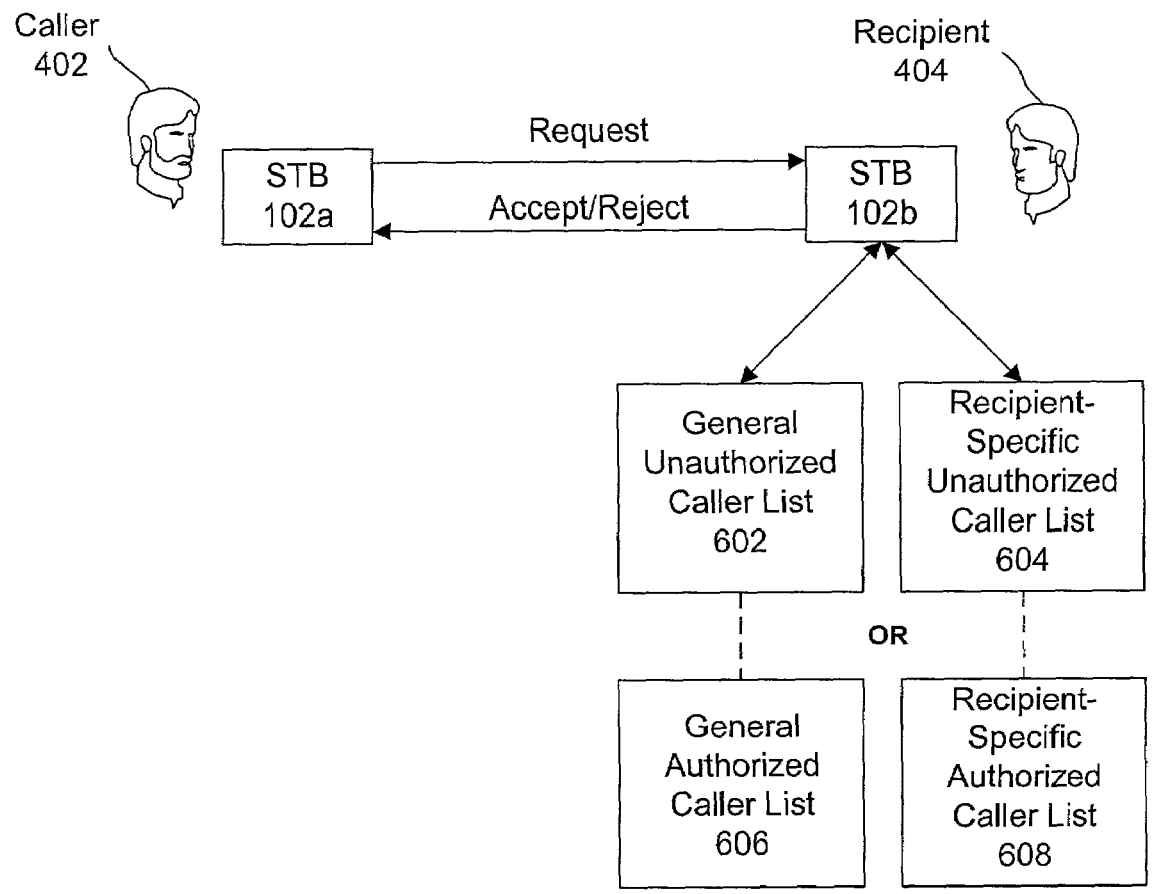
FIG. 6 is a dataflow diagram of a third embodiment of the invention.

In certain embodiments, the aforementioned lists 406, 502 may be recipient-specific. For example, as shown in FIG. 6, an STB 102b may include a general unauthorized caller list 602, similar to the list 406 of FIG. 4, which applies to all recipients 404. In addition, or in the alternative, the STB 102b may include a recipient-specific unauthorized caller list 604, which is only applicable to the recipient 404.

In such an embodiment, the recipient 404 may be identified using information contained within the video communication request. For example, a request may include an e-mail address, e.g., dave@myhome.net, which may identify both a destination STB 102b, e.g., myhome.net, as well as a recipient 404, e.g., dave. Alternatively, a unique identifier, e.g., an IPv6 address, may be used to uniquely identify each recipient 404.

Also possible are a general authorized caller list 606 (similar to the list 502 of FIG. 5) and/or a recipient-specific authorized caller list 608 (which applies only to the recipient 404). Various combinations of lists (authorized, unauthorized, general, recipient-specific) are encompassed within the scope of the present invention.

Figure 7:
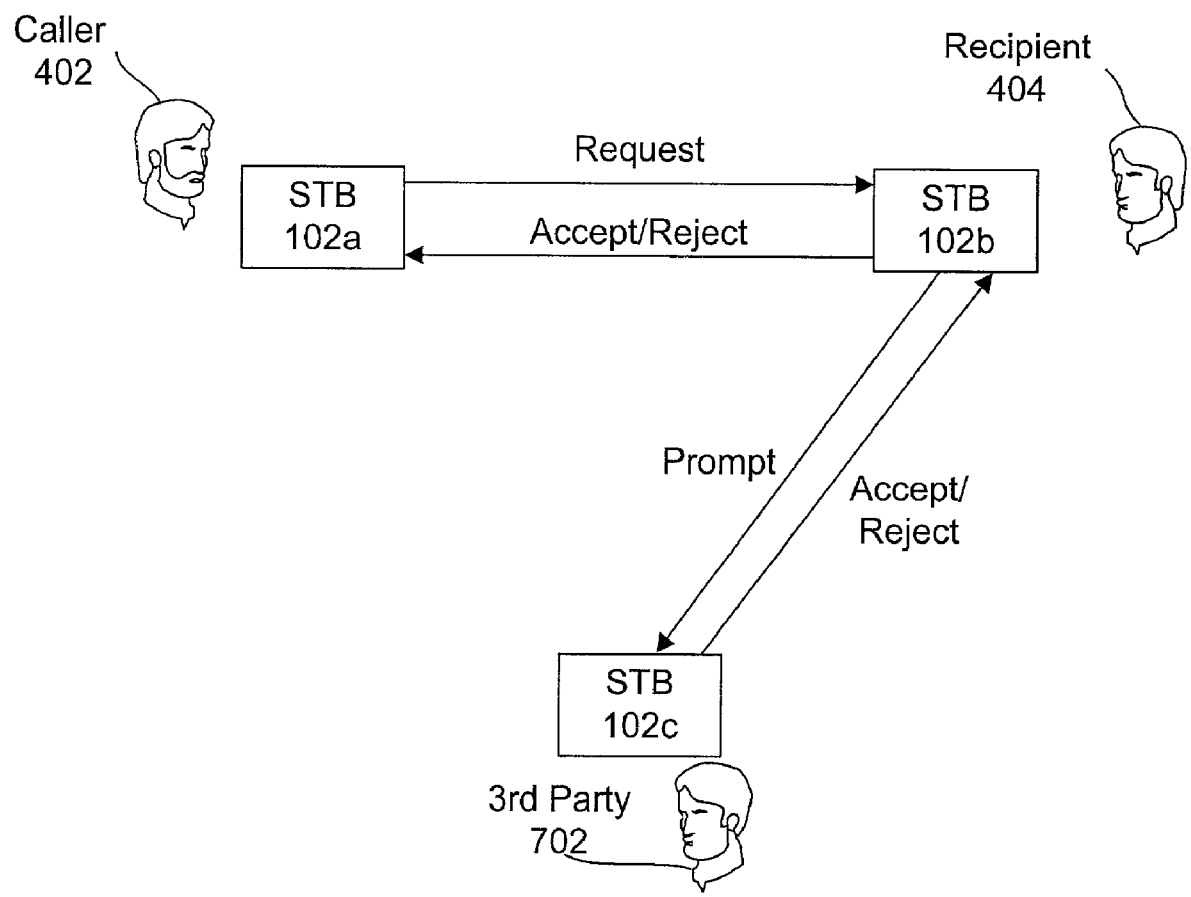
FIG. 7 is a dataflow diagram of a fourth embodiment of the invention.

In certain embodiments, as shown in FIG. 7, a third party 702 may determine whether the video communication request should be accepted or rejected. The third party 702 may be a parent or another party responsible for the well-being of one or more recipients 404 associated with an STB 102b.

As discussed above, a caller's STB 102a sends a video communication request to a recipient's STB 102b, where the request is intercepted. The STB 102b may then identify the caller 402 and the recipient 404 using information within the video communication request.

Unlike the previous embodiments, however, the STB 102b prompts a third party 702 for an indication of acceptance or rejection. In one embodiment, the third party 702 is prompted with the identities of both the caller 402 and the recipient 404 to enable the third party 702 to properly screen the video communication. In some cases, the request may include live video captured by the caller's STB 102a, which may help to identify the caller 402. Where the request does not identify the caller 402, the third party 702 may be always prompted, or never prompted, depending on the third party's preference.

If the third party 702 indicates that the request should be rejected, the STB 102b rejects the request. If, however, the third party 702 indicates acceptance of the request, the STB 102b may accept the request, subject to acceptance by the recipient 404. In certain configurations, if the third party 702 does not respond within an established time interval, the STB 102b may automatically reject the request as though the third party 702 indicated that the request should be rejected.

As illustrated, the third party 702 may be associated with a different STB 102c than the recipient's STB 102b. The third party's STB 102c and recipient's STB 102b may be located in different rooms of the same house or office, or in completely different geographic areas of the world.

The third party 702 may be prompted using any conventional mechanism. For example, a pop-up window, graphical text overlay, or the like, may be displayed notifying the third party 702 of the request and the identities of the caller 402 and the recipient 404. Acceptance or rejection of the request may be indicated by pressing a particular button on a remote control 106, selecting a menu option displayed on a television 104, or the like.

Figure 8:
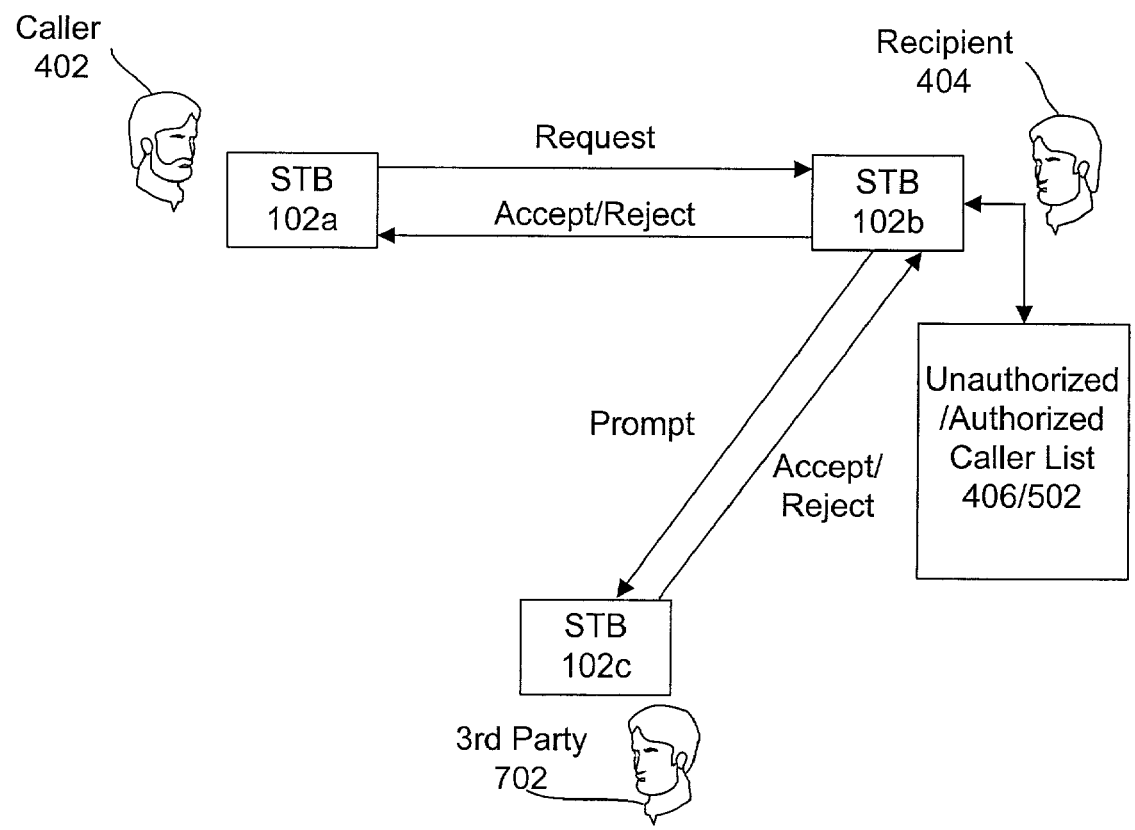
FIG. 8 is a dataflow diagram of a fifth embodiment of the invention.

As shown in FIG. 8, third-party screening may be combined with any of the screening embodiments using unauthorized/authorized lists 406, 502, as described in connection with FIGS. 4–7. For example, a caller 402 may be pre-screened using an unauthorized caller list 406. If the caller 402 is not found within the list 406, the third party 702 may then be prompted for acceptance or rejection of the request.

Even where a caller 402 is found within an unauthorized caller list 406, the third party 702 may still wish to be notified so that the third party 702 may confer with the caller 402 regarding the attempted communication. As described in greater detail below, the third party 702, in one embodiment, may establish temporary video communication with the caller 402 to facilitate the screening process.

In certain embodiments, the STB 102b may be configured to update screening lists 406, 502, 602, 604, 606, 608 based on the response (e.g., reject or accept) from the third party 702. For example, a rejection from the third party 702 may cause the STB 102b to add the caller 402 to a general unauthorized caller list 602 or a recipient-specific unauthorized caller list 604. Similarly, an acceptance response may cause the caller 402 to be added to a general authorized caller list 606 or a recipient-specific authorized caller list 608.

Figure 9:
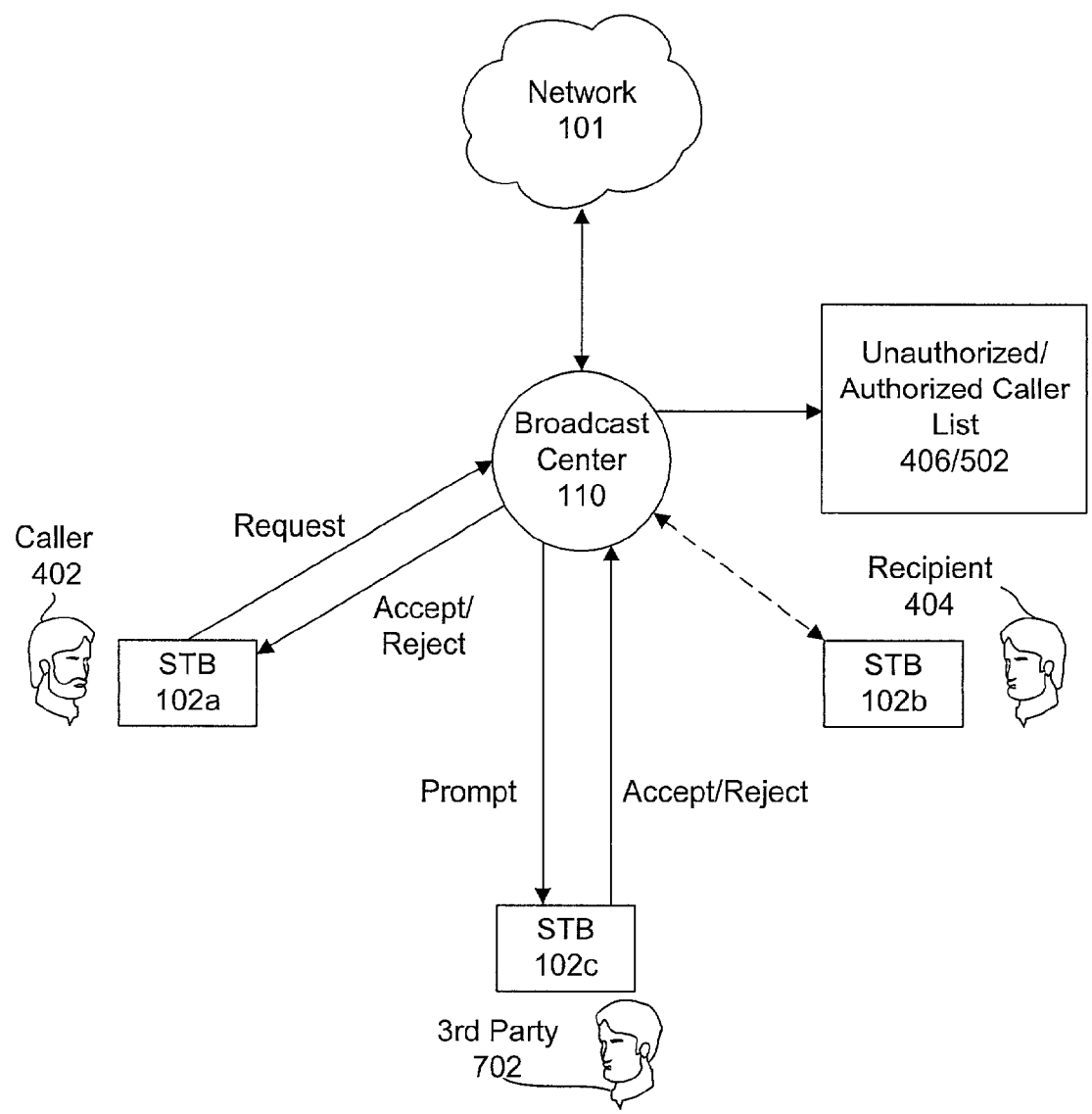
FIG. 9 is a dataflow diagram of a sixth embodiment of the invention.

As shown in FIG. 9, the screening process need not be performed at the recipient's STB 102b. For instance, a broadcast center 110, Internet server, or other intermediate network node may be configured to intercept and screen requests based on the above-described lists 406, 502, 602, 604, 606, 608, which may be stored within, or may be accessible to, the broadcast center 110. Preferably, all such lists 406, 502, 602, 604, 606, 608 are specific to the recipient's STB 102b, allowing the broadcast center 110 to provide screening services for multiple customers.

As previously noted, a broadcast center 110 may be embodied, for example, as a cable head-end or a satellite broadcast center. In the depicted embodiment, video communication between STBs 102 passes through at least one broadcast center 110, enabling the broadcast center 110 to intercept the request.

The broadcast center 110 may also be configured to prompt a third party 702 at a remote STB 102c to accept or reject a request. Thus, all of the embodiments disclosed in FIGS. 4–8 may be accomplished within the context of the broadcast center 110.

A parent or other responsible party may be permitted to interact with the broadcast center 110 using a Web browser or other interface to create or update the various lists 406, 502, 602, 604, 606, 608 for the recipient's STB 102b. As previously noted, security mechanisms, such as passwords, may be used to limit access to authorized persons.

Figure 10:
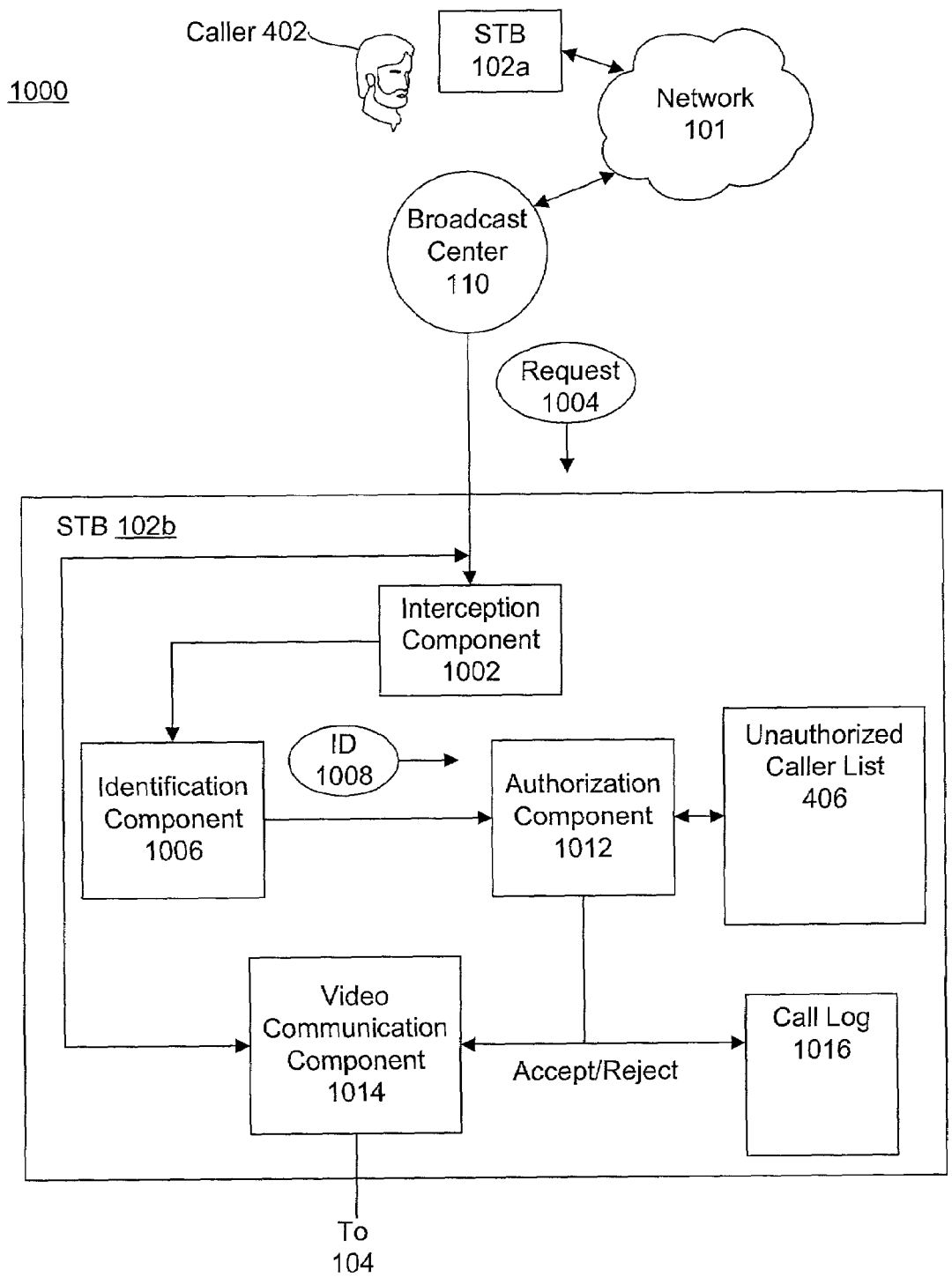
FIG. 10 is a block diagram of logical components of a system for screening incoming video communications.

Referring now to FIG. 10, a system 1000 for screening incoming video communications within an interactive television system is illustrated. In one embodiment, the system 1000 includes an interception component 1002, which intercepts a video communications request 1004 as described in connection with FIG. 4.

The interception component 1002 provides the video communication request 1004 to an identification component 1006, which identifies the caller 402 (and, in certain embodiments, the recipient 404). In one configuration, the identification component 1006 extracts an identifier 1008 of the caller 402 from the request 1004. The identifier 1008 may include, for example, the caller's name, the caller's network address, the network address of the caller's STB 102a, and the like. In the depicted embodiment, the extracted identifier 1008 is then passed to an authorization component 1012.

The authorization component 1012 is coupled, in one embodiment, to an unauthorized caller list 406. The unauthorized caller list 406, as well as the other screening lists 502, 602, 604, 606, 608 described above, may be implemented using well known data structures including arrays, linked lists, stacks, queues, databases, etc.

In an alternative embodiment, as described with reference to FIG. 6, the authorization component 1012 may be further configured to use an identifier (not shown) of the recipient 404 to locate a recipient-specific unauthorized caller list 604. As previously noted, recipient-specific lists 604, 608 are similar to the general lists 406, 502, 602, 606, except that the list applies to a specific recipient 404.

To determine whether a caller 402 is included within the unauthorized caller list 406, the authorization component 1012 searches the list 406 for a match with the extracted caller identifier 1008. If an exact or sufficiently close match is found, then a reject message is sent to a video communications component 1014. If a match is not found, then an accept message is sent to a video communications component 1014. In one configuration, if rejected, the video communication request 1004 and any related meta-data may be stored in a call log 1016 for later review by a recipient 404, a parent, or other responsible person.

In fact, all video communication requests (inbound or outbound) may be recorded in a "message detail record" log (not shown) which can serve multiple purposes, e.g., reconciliation of the billing for usage of the video communications, recording or documenting abusive behavior, allowing the user to select a "calling area" for high frequency of calls to other users in a calling area (similar to telephone billing plans).

If the authorization component 1012 provides an accept message, the video communications component 1014 prompts the recipient 404 for acceptance of the video communication. If the recipient accepts, the video communications component 1014 establishes two-way video communication between the caller 402 and recipient 404

If the authorization component 1012 provides a reject message, the video communications component 1014 may terminate the communication process. In one embodiment, the video communications component 1014 may send a message to the STB 102a notifying the caller 402 of the rejection, including information on re-directing the call to a parent or other authorized person.

Figure 11:
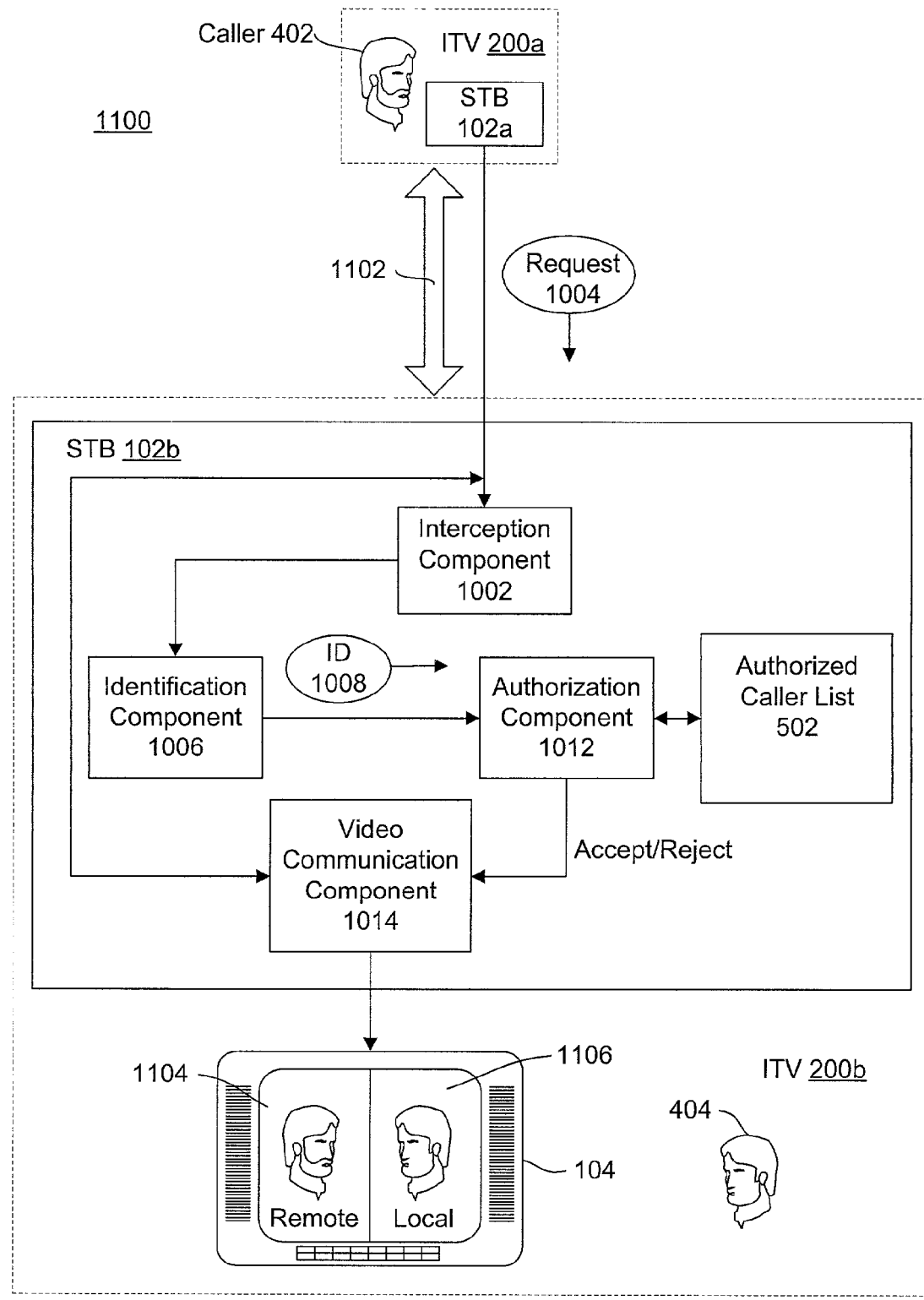
FIG. 11 is a block diagram of logical components of an alternative system for screening incoming video communications.

FIG. 11 illustrates a system 1100 for screening incoming video communications using a authorized caller list 502 as described above in relation to FIG. 5. Similar to the system 1000 in FIG. 10, a video communication request 1004 is processed by an interception component 1002 and an identification component 1006, after which a caller identifier 1008 is provided to an authorization component 1012.

In this embodiment, the caller identifier 1008 is used to search for a match within an authorized caller list 502. As in FIG. 5, if the caller identifier 1008 is found in the authorized caller list 502, an accept message is sent to the video communication component 1014. If, however, the caller identifier 1008 is not found in the authorized caller list 502, a reject message is sent to the video communication component 1014.

In the depicted embodiment, the accept message causes the video communication component 1014 to establish two-way video communication 1102 between the caller's STB 102a and the recipient's STB 102b, subject, of course, to acceptance by the recipient 404.

In one implementation, the video communication component 1014 manages the two-way video communication 1102 from establishment to termination. Various systems are known for providing two-way video communication, such as Microsoft Netmeeting® and CuSeeMe®.

During two-way video communication, a video camera 246 (not shown) integrated with the caller's Interactive television system (ITV) 200a, captures video signals of the caller 402 and transmits them through the network 101 to the recipient's ITV 200b. Likewise, a microphone 242 (not shown) integrated with the caller's ITV 200a captures audio signals and transmits them to the recipient's ITV 200b where speakers 244 (not shown) convert the audio signals to sound waves. Similarly, the recipient's ITV 200b sends audio and video signals to the caller's ITV 200a.

In certain embodiments, a televisions 104 of the caller 402 and the recipient 404 display remote 1104 and local 1106 views in a split-screen arrangement. For example, in the case of the recipient 404, the remote video view 1104 includes video images of the caller 402 and the local video view 1106 includes video images of the recipient 404. Of course, other display configurations may be used to conduct video communications, including Picture-in-Picture (PIP), multi-sectioned displays and the like.

FIG. 12 illustrates an exemplary unauthorized caller list 406 and an exemplary authorized caller list 502 according to an embodiment of the invention. In the depicted embodiment, the unauthorized caller list 406 includes a name field 1202, a reason field 1204, and an address field 1206 for each caller 402. Of course, more or fewer fields may be provided in other embodiments.

The address field 1206 may include a network address, such as an IP address, of the caller's STB 102a. Preferably, either the name field 1202 or the address field 1206 is unique for each caller 402.

The reason field 1204 allows a parent or guardian to identify why the caller 402 was placed on the list 406. For example, "Brad Smith" was placed on the list because he was "Convicted of a Felony." The reason field may 1204 be automatically generated, for example, in response to a third party 702 accepting or rejecting a request, as described in connection with FIG. 7.

The authorized caller list 502 may include similar fields 1202, 1204, 1206 for each caller 402. Here, the reason field 1204 may not relate directly to why the caller 402 is on the list 502, but, instead, may indicate a relationship between the caller 402 and the recipient 404. For example, "Bert Abrahms" may be a "Relative" of those in a household associated with the recipient's STB 102b.

Of course the unauthorized caller list 406 and authorized caller list 502 may include as many callers 402 as necessary. Those of relevant skill in the art will recognize that the unauthorized caller list 406 and authorized caller list 502 need not be contained within separate data structures. For example, a single table may be provided, with a field (not shown) for indicating whether an entry corresponds to the unauthorized caller list 406 or the authorized caller list 502.

FIG. 13 illustrates a table representing a recipient-specific unauthorized caller list 604. As mentioned above, the recipient-specific unauthorized caller list 604 facilitates screening for a particular recipient 404. For example, the age of son #1 and other circumstances may have lead to a court order forbidding video communication between a father, "Frank Jones" and son #1. Accordingly, the father "Frank Jones" is added to the recipient-specific unauthorized caller list 604 for son #1.

Figure 14:
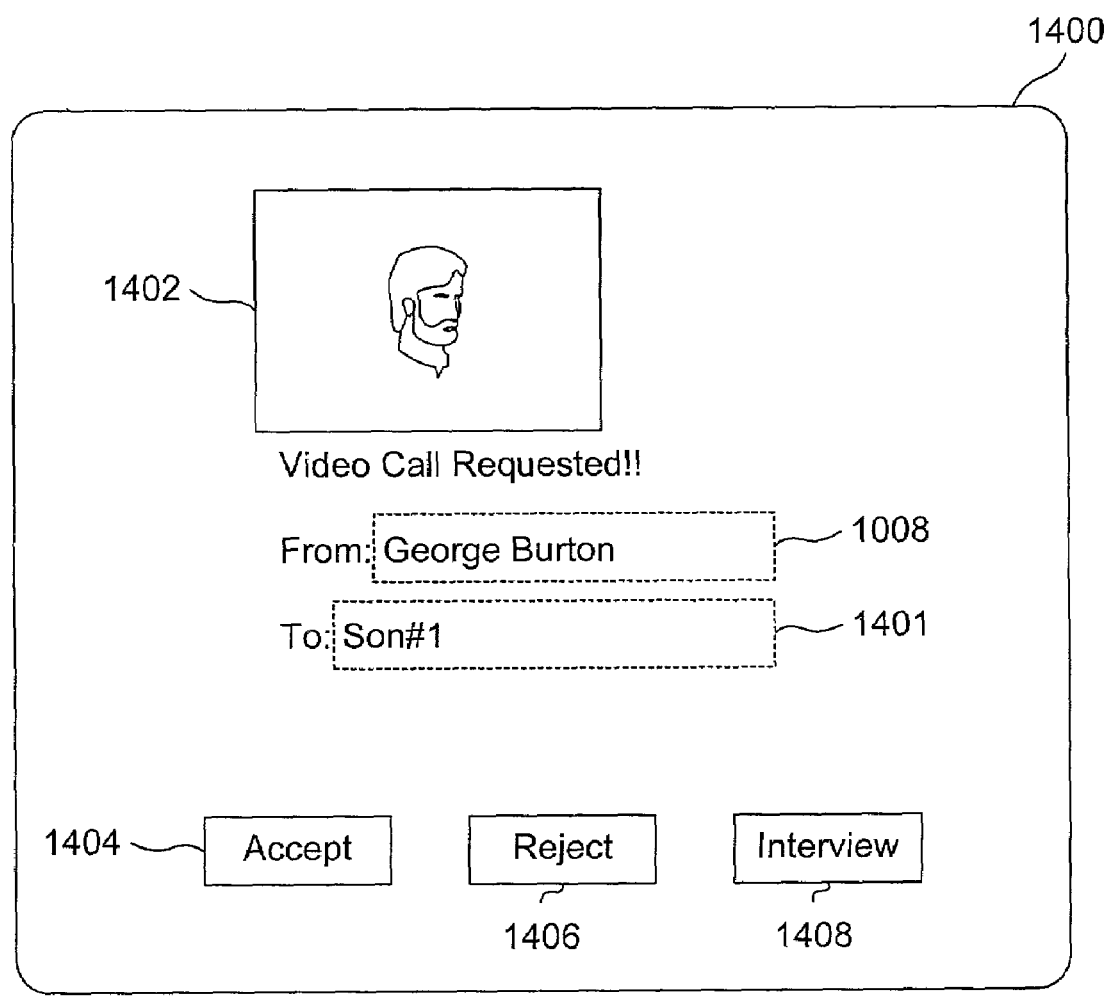
FIG. 14 illustrates a user interface for third-party screening of video communication requests.

FIG. 14 illustrates a user interface 1400 for prompting a third party 702 to accept or reject a request. In one embodiment, the prompt includes a caller identifier 1008 and a recipient identifier 1401. For example, the caller identifier 1008 may include the name of the caller 402, "George Burton." In addition, the prompt may include a video view 1402 of the caller 402. The video view 1402 may include live or recorded video images of the caller 402. The video view 1402 allows the third party 702 to get a visual impression of the caller 402 to facilitate the screening process.

To facilitate a response from the third party 702, the user interface 1400 may include a plurality of buttons 1404, 1406, 1408. An accept button 1404 provides an accept response to the authorization component 1012, indicating that the request is accepted, while the reject button 1406 provides a reject response.

In one embodiment, an interview button 1408 may allow the third party 702 to establish two-way video communication with the caller 402 prior to authorizing the video communication request. A video view 1402 may display live video received from the caller's STB 102a, allowing the third party 702 to see the caller 402 before making a decision whether to accept or reject the request. The live video may be part of the request or may follow the request. In certain embodiments, where live video is not available, a third party may opt to have the STB 102b reject the request by default.

Figure 15:
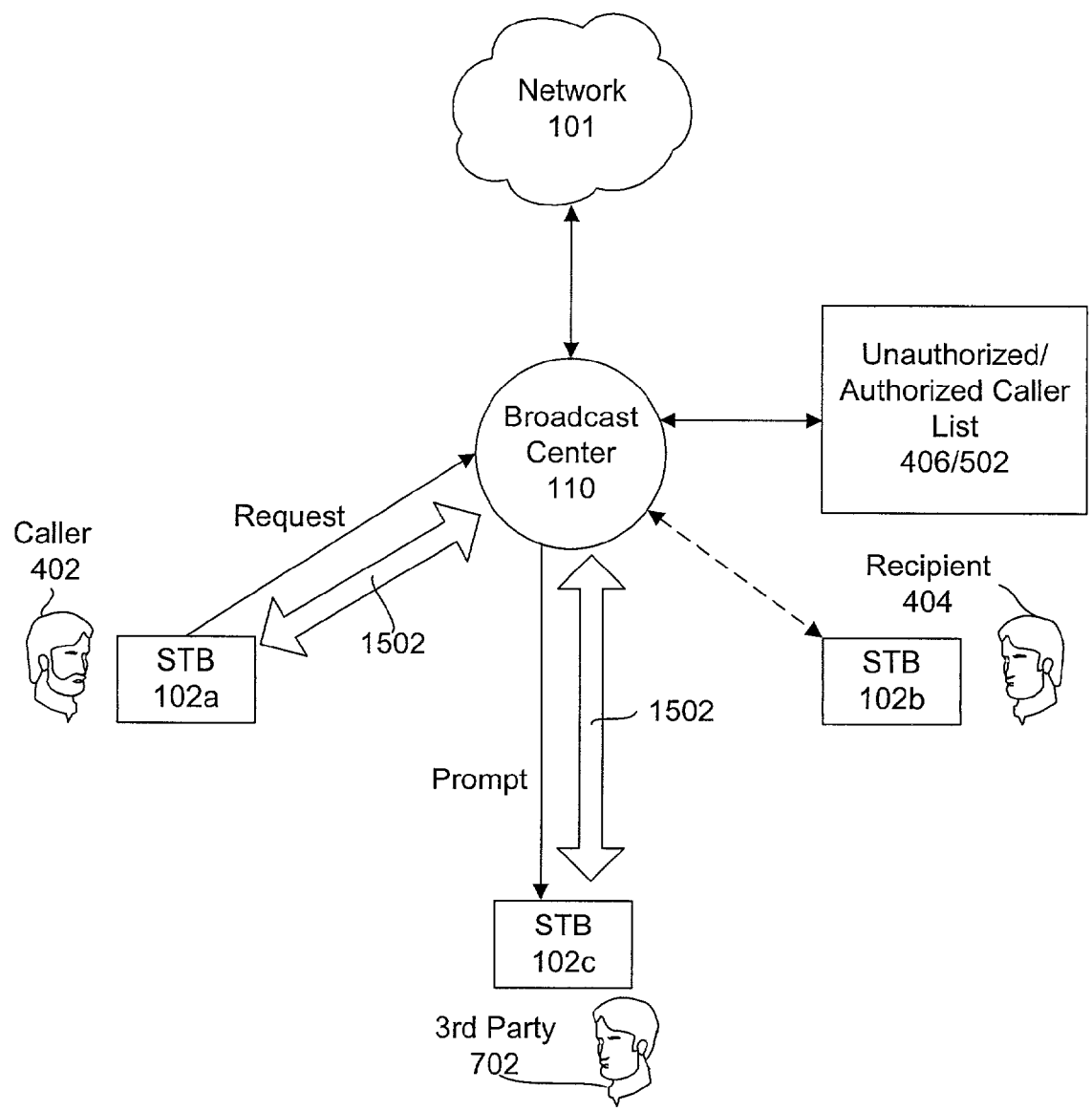
FIG. 15 is a dataflow diagram of a seventh embodiment of the invention.

FIG. 15 illustrates one embodiment of the invention that allows a third party 702 to interview the caller 402. As with most forms of communication, video communication that employs screening may be susceptible to "spoofing," where the caller 402 pretends to be another person. For example, the caller 402 may configure his STB 102a to send a false name or address, or to provide a pre-recorded video clip purported to be live video.

The third party 702 can dispel all doubt about the identity of the caller 402 by activating the interview button 1408 and conducting an interview with the caller 402. In one embodiment, the interview button 1408 causes the video communication component 1014 to establish temporary two-way video communication 1502 between the caller 402 and the third party 702. The third party 702 may then question the caller 402 while watching the video view 1402 to verify that the video view 1402 does contain live video. For example, the third party 702 may ask the caller 402 to perform visual acts (e.g., close your eyes) that would not be possible to predict and pre-record.

Figure 16:
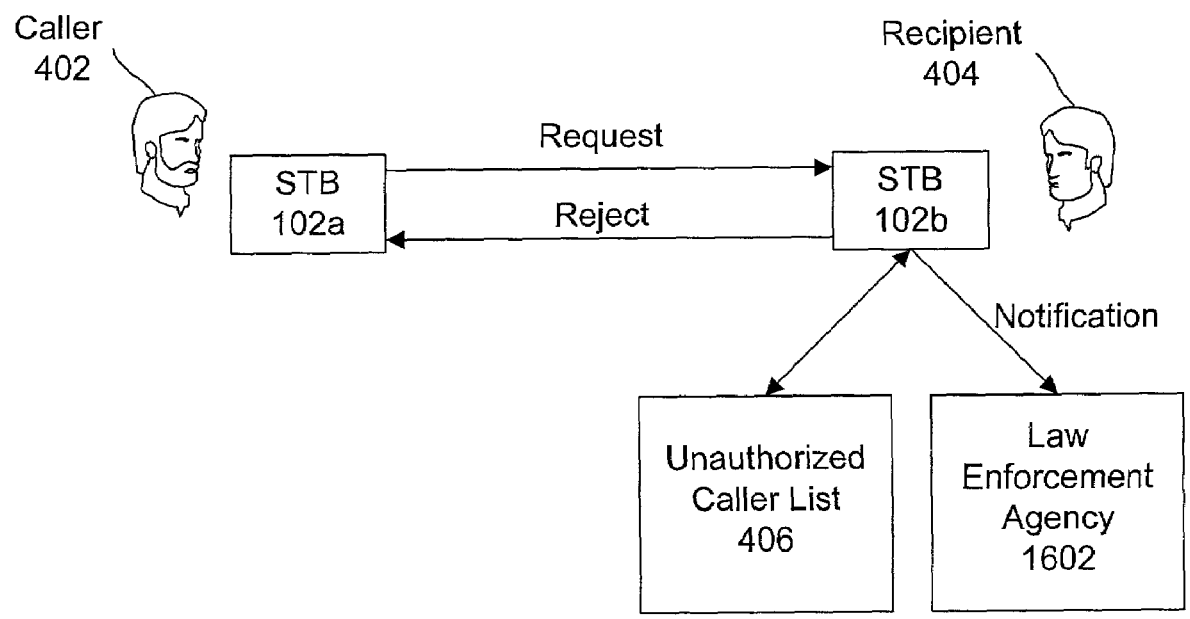
FIG. 16 is a dataflow diagram of an eighth embodiment of the invention.

FIG. 16 illustrates yet another embodiment of the invention in which a recipient's STB 102b is configured to notify a law enforcement agency 1602 in response to receiving one or more requests from a caller 402 on the unauthorized caller list 406.

For example, a caller 402 may make multiple requests to communicate with a recipient 404 either in an attempt to overload STB 102b or harass the recipient 404. In one embodiment, STB 102b maintains a count of the number of failed attempts by the caller 402, which may be included in a notification to the law enforcement agency 1602. In some cases, a notification is not sent until the number of failed attempts reaches an established threshold, which may be set by local law.

The notification may be sent via email, instant messaging, fax or other communication medium. Preferably, the notification includes the caller identifier 1008, the number of video communication request attempts made, and details surrounding each video communication request, such as the time and date of the request and the reason for which the caller 402 was added to the list 406, e.g., court order, known felon, etc. Additionally, the notification may include a recipient identifier 1401 and any live video information captured of the caller 402. Information included in the notification may enable the law enforcement agency 1602 to act to stop video communication requests from the caller 402 to the recipient 404, and may be useful in enforcing court orders, etc.

Figure 17:
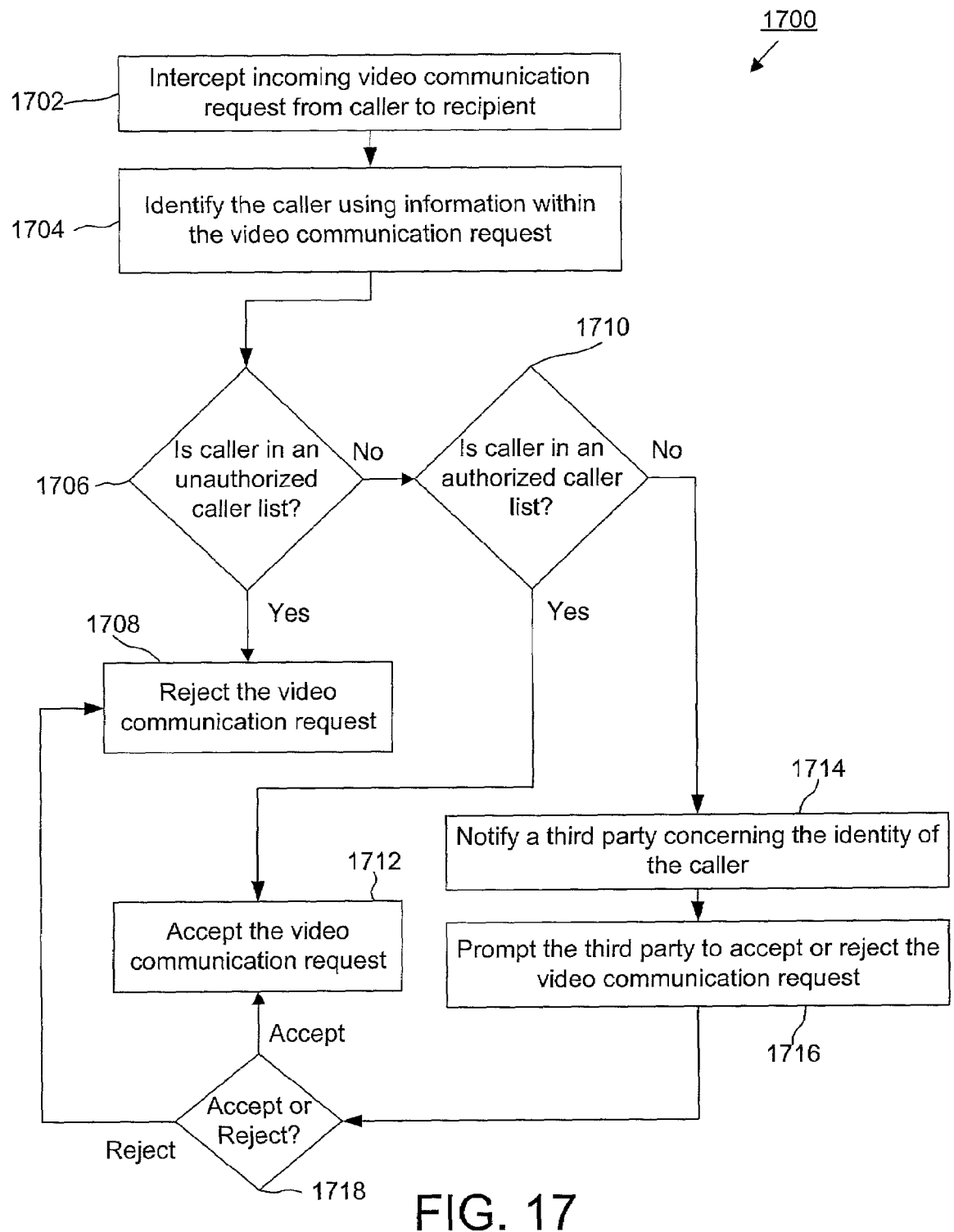
FIG. 17 is a flowchart of a method for screening incoming video communications within an interactive television system.

Referring now to FIG. 17, there is shown a flowchart of a method 1700 for screening incoming video communications in an interactive television system 200. The illustrated method 1700 screens incoming calls based on an unauthorized caller list 406, an authorized caller list 502, and a third party 702. Of course, the invention need not use both lists 406, 502, or rely on a third party 702 for screening.

The method 1700 begins by intercepting 1702 a video communication request sent from a caller 402 to a recipient 404. Thereafter, the caller 402 is identified 1704 using information within the video communication request.

In certain configurations, a determination 1706 is then made whether the caller 402 is within an unauthorized caller list 406. If so, the video communication request is rejected 1708. If not, a determination 1710 is made whether the caller 402 is within an authorized caller list 502. If so, the video communication request is accepted 1712, subject to acceptance by the recipient 404.

If the caller is not within the authorized caller list 502, then a third party 702 is notified 1714 of the caller's identity in one embodiment. The third party 702 is also prompted 1716 to accept or reject the video communication request.

Thereafter, a determination 1718 is made whether the third party 702 accepted or rejected the video communication request. If the third party 702 accepted the request, then the video communication request is accepted 1712; otherwise, the request is rejected 1708.

As noted previously, the above-described systems and methods may be applied to outgoing, as well as incoming, video communication requests. Just as it is important for parents to screen calls directed to their children, it is also important for parents to screen calls made by their children. People with criminal intentions may attempt to defeat the unauthorized/authorized caller lists 406, 502 described above by providing children with their video communication addresses (e.g., videophone numbers) and allowing the children to become the callers 402.

Figure 18:
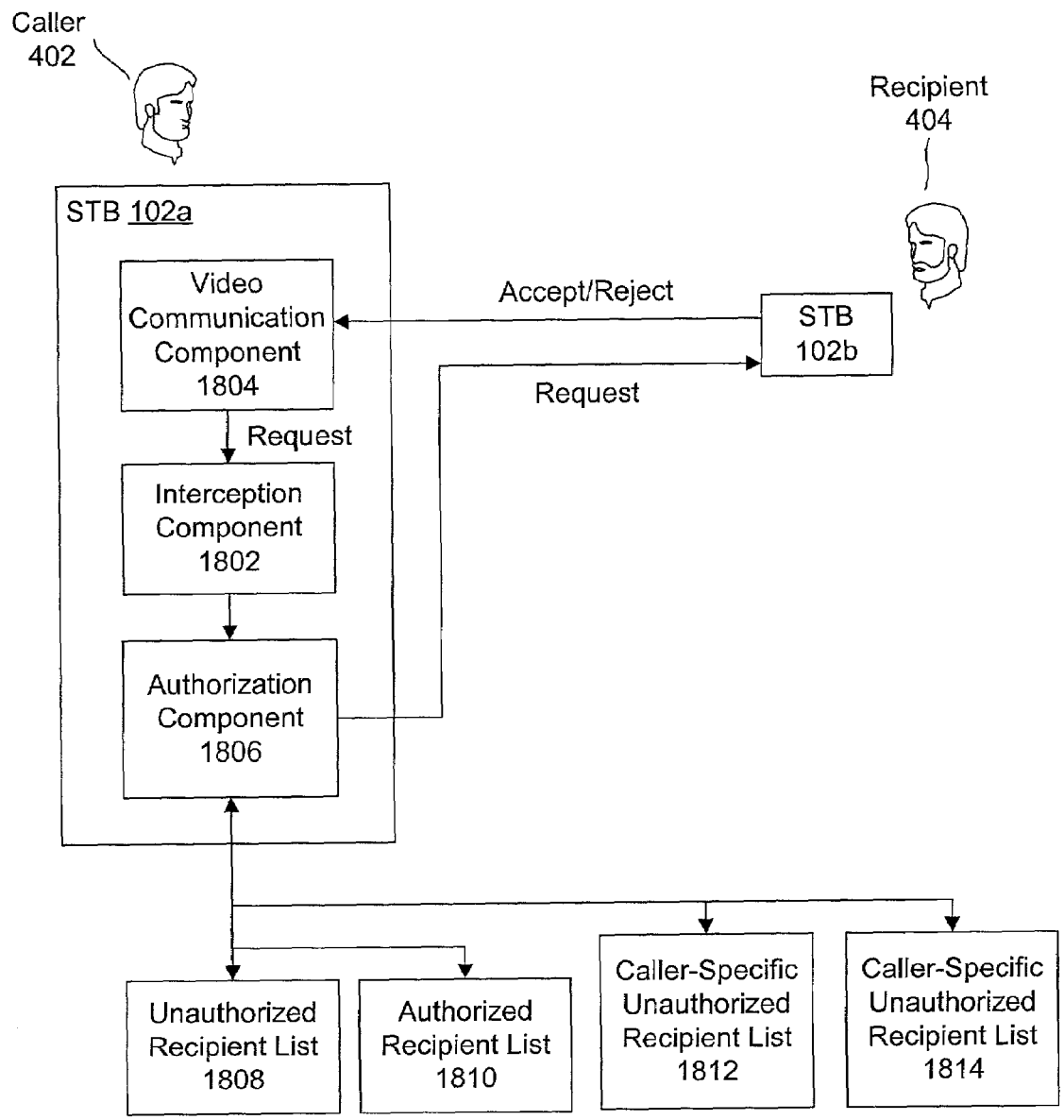
FIG. 18 is a dataflow diagram of a ninth embodiment of the invention.

FIG. 18 illustrates a system 1800 for screening outgoing video communications according to an embodiment of the present invention. As shown, the caller's STB 102a may be configured with an interception component 1802 that intercepts an outgoing video communication request generated by a video communication component 1804. The interception component 1802 and the video communication component 1804 may be similar or identical to those described with reference to FIG. 10.

The interception component 1804 may provide the intercepted request to an authorization component 1806, which may include or have access to one or more unauthorized recipient lists 1808, authorized recipient lists 1810, caller-specific unauthorized recipient lists 1812, and/or caller-specific authorized recipient lists 1814. These lists 1808, 1810, 1812, 1814 are similar or identical to the corresponding lists 602, 606, 604, 608 illustrated in FIG. 6, except that they are applied to the recipient's identity rather than the caller's identity. An identification component (not shown) may be provided to determine the identity of the recipient 404 based on information contained within the request, as previously discussed.

For example, the authorization component 1806 may determine whether the recipient 404 is identified within the unauthorized recipient list 1808. If the recipient 404 is in the list 1808, the authorization component 1806 may block the request, e.g., not allow the request to be sent to the recipient's STB 102b. The authorization component 1806 may notify the caller 402 that the request was blocked due to the recipient 404 being in the list 1808.

Alternatively (or in addition), the authorization component 1806 may determine whether the recipient 404 is identified within the authorized recipient list 1810. In one embodiment, the authorization component 1806 forwards the request to the recipient's STB 102b for acceptance or rejection only if the recipient 404 is in the list 1810. Thus, the caller 402 may only contact those recipients 404 who are in the list 1810.

Of course, the above-described lists may be caller-specific in certain embodiments. This is advantageous in that certain callers 402, such as older children or adults, may not need any restrictions, while younger callers 402 may be limited to, or restricted from, certain recipients 404.

Figure 19:
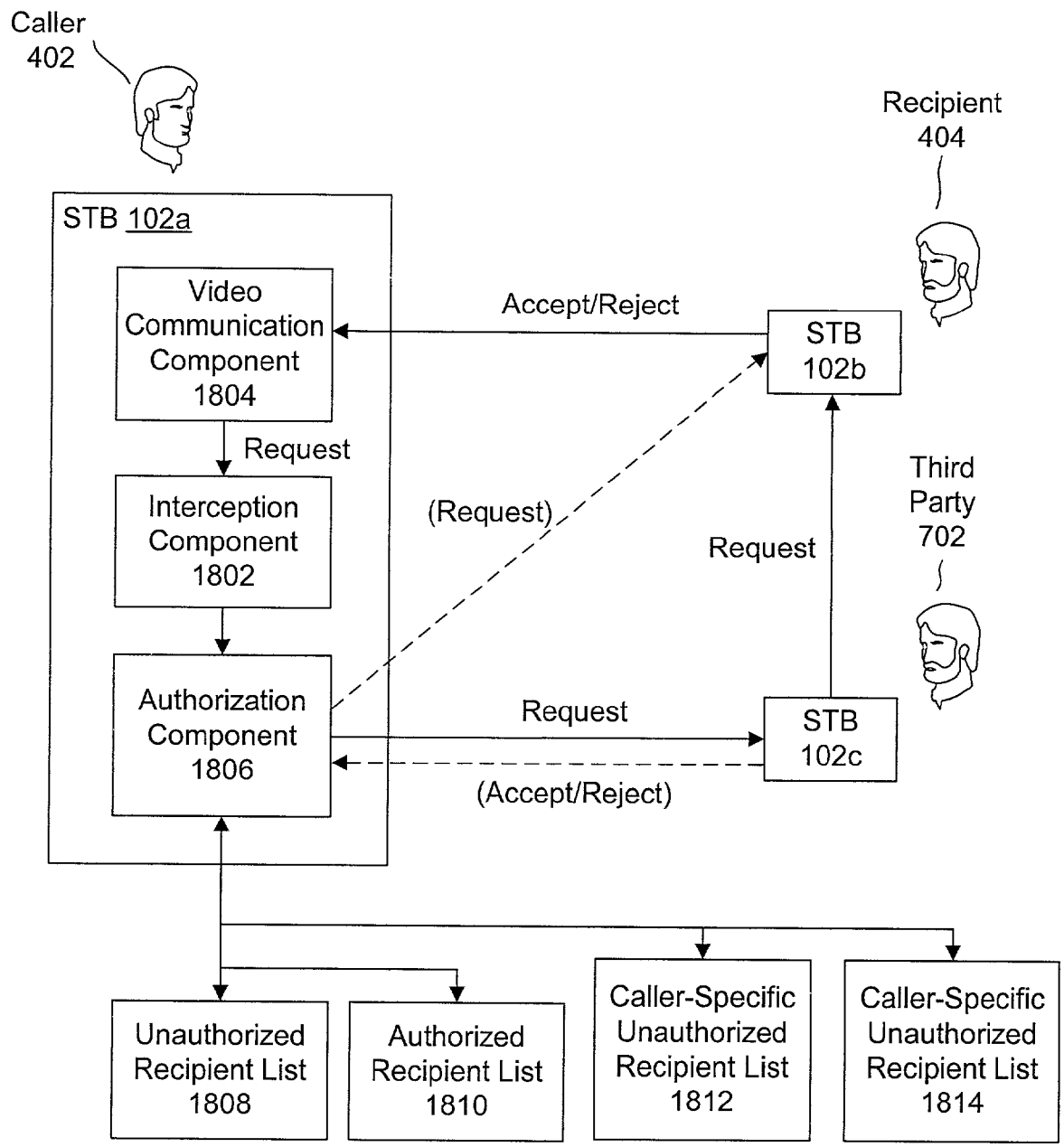
FIG. 19 is a dataflow diagram of a tenth embodiment of the invention.

As shown in FIG. 19, a third party 702 may also be involved in the screening process. For example, the authorization component 1806 may send the request to a third party 702 for acceptance or rejection. If the third party 702 accepts the request, the request may be forwarded to the recipient 404 for acceptance or rejection. If the third party 702 rejects the request, the request is blocked, e.g., not forwarded to the recipient 404.

In an alternative embodiment, the third party 702 notifies the authorization component 1806 whether the request was accepted or rejected. Thereafter, if the request was accepted by the third party 702, the authorization component 1806 forwards the request to the recipient 404; otherwise, the authorization component 1806 blocks the request.

In certain embodiments, the request may include live video of the caller 402 captured by the video camera 246 of FIGS. 2–3. The third party 702 may view the live video to determine whether the caller 402 is, in fact, who he or she claims to be. This prevents, for example, a younger child using an older child's identifier to spoof the screening system.

In some cases, the third party 702 may establish temporary two-way communication with the caller 402 in order, for example, to query the caller 402 regarding the identity of recipient 404 and/or the purpose of the communication. This may allow the caller 402 to ask the third party 702 for permission to contact the recipient 402 where such would not normally be permitted by the unauthorized recipient list 1808 or the authorized recipient list 1810 alone.

Figure 20:
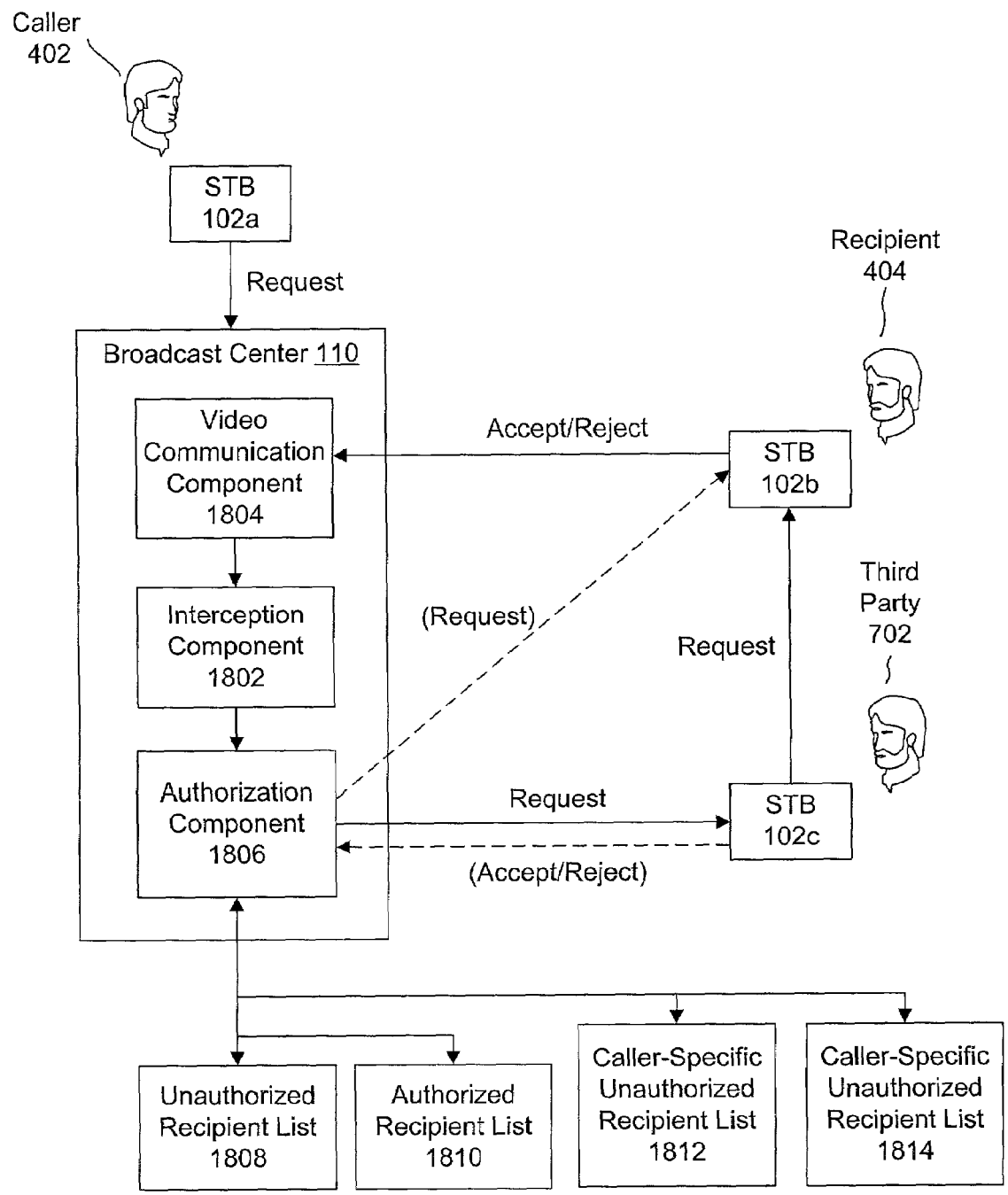
FIG. 20 is a dataflow diagram of an eleventh embodiment of the invention.

As illustrated in FIG. 20, the above-described screening process need not be performed within the STB 102a. For example, the various components described above may operate within an intermediate network node linking the STBs 102a, 102 of the caller 402 and recipient 404, respectively. The intermediate network node may be embodied as a cable head-end, a satellite broadcast center, an Internet server, or the like.

Figure 21:
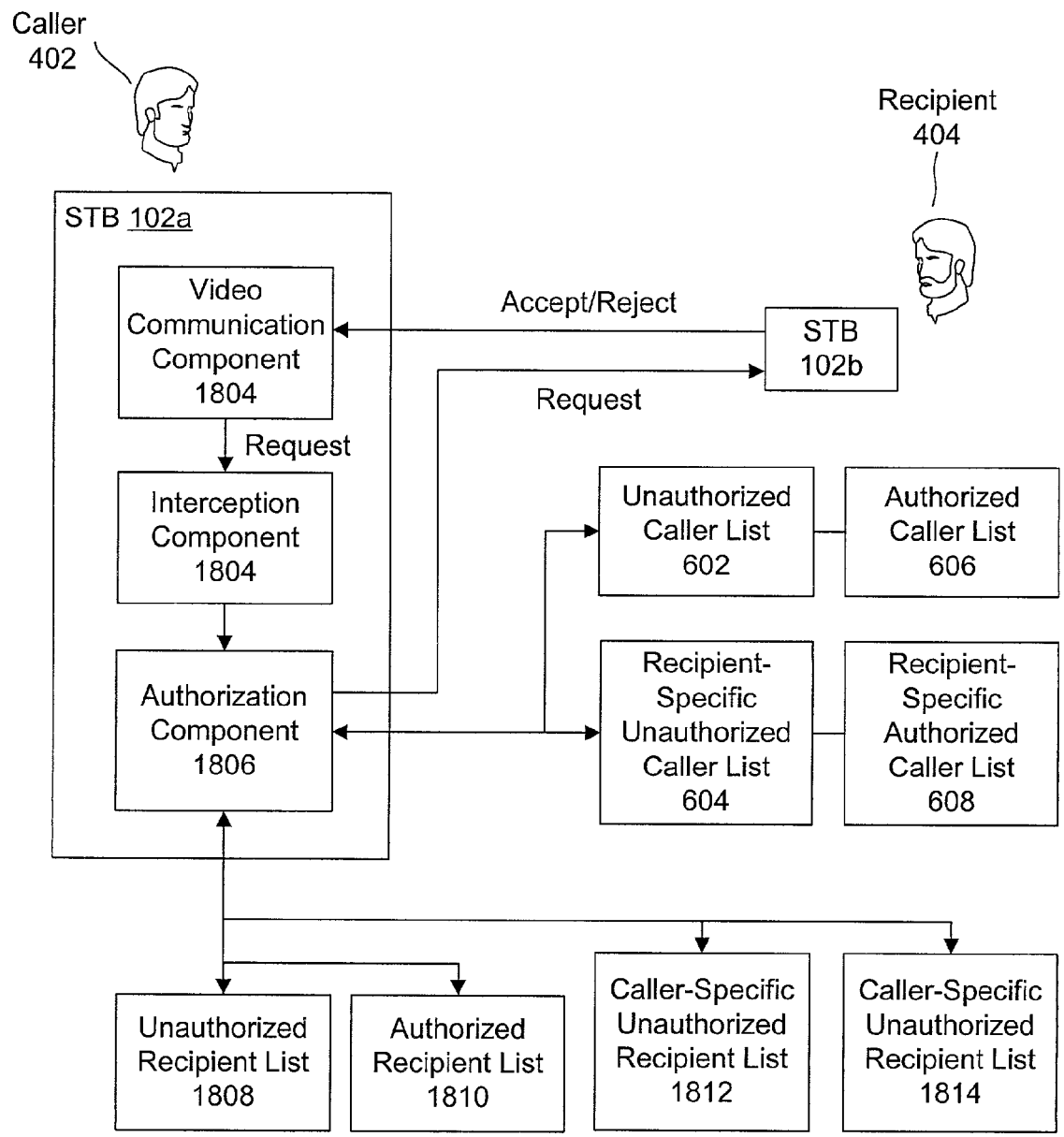
FIG. 21 is a dataflow diagram of an eleventh embodiment of the invention.

Of course, as shown in FIG. 21, screening of both incoming and outgoing video communications may be provided. The authorization component 1806 may be configured to use both unauthorized/authorized caller lists 602, 604 and unauthorized/authorized recipient lists 1802, 1804, as well as recipient/caller-specific variations thereof. The same or different lists may be used for incoming and outgoing calls.

In alternative embodiments of the invention, parents or other responsible persons may block expensive outbound video calls, e.g., the video equivalent of a telephony long distance call, using the above-described techniques. For example, the parent may block all calls that exceed a particular preset rate. Moreover, parents may establish a communication quota based on a set number of minutes per day, a cumulative number minutes per week, or a combination of both. In still other embodiments, parents may tie the above-described limits to a child's spending allowance, which may be redeemed, for example, in video communication minutes, instant messaging minutes, kilobytes of e-mail messages, and the like.

Based on the foregoing, the present invention offers a number of advantages not available in conventional approaches. Incoming/outgoing video communications from/to certain individuals or devices may be selectively restricted. Likewise, incoming/outgoing video communications may be limited to those from/to certain individuals or devices. In addition, a parent or other responsible party may selectively screen incoming/outgoing video communications from/to unknown individuals or devices.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for screening video communications in an interactive television system, the method comprising:
   intercepting a video communication request sent by a caller to a recipient;
   identifying the recipient using information contained within the video communication request;
   notifying a third party concerning the identity of the recipient;
   prompting the third party for acceptance of rejection of the video communication request; and
   forwarding the video communication request to the recipient in response to receiving an indication of acceptance from the the party.

2. The of claim 1, further comprising:
   identifying the caller using information contained within the video communication request;
   notifying the third party concerning the identity of the caller.

3. The methoed of claim 1, further comprising:
   in response to not receiving an indicaticn of acceptance from the third party within an established time interval, blocking the video communication request.

4. The method of claim 1, further comprising:
   in response to receiving an indication of rejection from the third party, blocking the video communication request.

5. The method of claim 1, wherein the video communication request is intercepted by an interactive television system of the caller.

6. The method of claim 1, wherein the caller and third party are each associated with an interactive television system of the different location.

7. The method of claim 1, wherein the video communication request includes live video of the caller, and wherein notifying comprises:
   sending the live video of the caller to the third party.

8. The method of claim 7, wherein the live video is captured by a video camera integrated with an interactive television system of the caller.

9. The method of 1, wherein notifying comprises:
   establishing tempera two-way video communication between the third party and the caller.

10. The method of claim 1, wherein accepting comprises:
    establishing two-way video communication between the recipient and the caller.

11. A method for screening video communications in an interactive television system, the method comprising:
    intercepting a video communication request sent a caller to a recipient;
    identifying the recipient using information contained within the video communication request;
    determining that the recipient is not identified within a unauthorized recipient list;
    notifying a third party concerning the identity of the recipient;
    prompting the third party for acceptance or rejection of the video communication request; and
    forwarding the video communication request to the recipient in response to receiving an indication of acceptance from the third party.

12. The method of claim 11, further comprising:
    identifying the caller using information contained within the video communication request; and
    notifying the third party concerning the identity of the caller.

13. The method of claim 11, further comprising:
    in response to not receiving an indication of acceptance from the third party within an established time interval, blocking the video communication request.

14. The method of claim 11, further comprising:
    in response to receiving an indication of rejection from the third party, blocking the video communication request.

15. The method of claim 14, further comprising:
    adding an indication of the recipient to an unauthorized recipient list.

16. The method of claim 11, wherein the caller and third party are each associated with an interactive television system at a different location.

17. The method of claim 11, wherein the video communication request includes live video of the caller, and wherein notifying comprises:
    sending the live video of the caller to the third party.

18. The method of claim 17, wherein the live video is captured by a video camera integrated with an interactive television system of the caller.

19. The method of claim 11, wherein notifying comprises:
    establishing temporary two-way video communication between the third party and the caller.

20. The method of claim 11, wherein the unauthorized recipient list is caller-specific, the method further comprising:
    identifying the caller using information contained within the video communication request; and
    locating an unauthorized recipient list to the caller.

21. A system for screening video communication in an interactive television system, the system comprising:
    an interception component configured to intercept a video communication request sent by a caller to a recipient;
    an identification component configured to identify the recipient using information contained within the video communication request;
    a notification component configured to notify a third party concerning the identity of the recipient and to prompt the third party for acceptance or rejection of the video communication request; and
    an authorization component configured to forwar the video communication request to the recipient in response to receiving indication of acceptance from the third party.

22. A system for screening video communications in an interactive television system, the system comprising:
    an interception component configured to intercept a video communication request sent by a caller to a recipient;
    an identification component configured to identify he recipient using information contained within the video communication request;
    an authorization component configured to determine that the recipient is not identified within a unauthorized recipient list;
    a notification component configured to notify a third party concerning the identity of the recipient and prompt the third part or acceptance or rejection of the video communication request; and
    wherein the authorization component is further configured to forward the video communication request to the recipient in response to receiving an indication of acceptance from the third party.

23. A system for screening video communications, the system comprising: p1 means for intercepting a video communication request sent by a caller to a recipient;

means for identifying the recipient using information contained within the video communication request;

means for notifying a third party concerning the identity of the recipient;

means for prompting the third party for acceptance or rejection of the video communication request; and means for forwarding the video communication request to the recipient in response to receiving an indication of acceptance from third party.

24. A method for screening video communications in an interactive television system, the method comprising;

intercepting a video communication request sent by a caller to a recipient;

identifying the caller using information contained within the video communication request;

notifying a third party concerning the identity of the caller;

prompting the third party for acceptance rejection of the video communication request; and accepting the video communication request in response to receiving an indication of acceptance from the third party.

25. The method of claim 24, further comprising:

identifying the recipient using information contained within the video communication request; and notifying the third party identity of the recipient.

26. The method of claim 24, further comprising:

in response to not receiving an indication of acceptance from the third party within an established time interval, rejecting the video communication request.

27. The method of claim 24, further comprising:

in response to receiving an indication of rejection from the third party, rejecting the video communication request.

28. The method of claim 24, wherein the video communication request is intercepted by an interactive television system of the recipient.

29. The method of claim 24, wherein the recipient and third party are each associated with an interactive television system at a different location.

30. The method of claim 24, wherein the video communication request includes live video of the caller, and wherein notifying comprises:

sending the live video of the caller to the third party.

31. The method of claim 30, wherein the live video is captured by a video camera integrated with an interact&e television system of the caller.

32. The method of claim 24, wherein notifying comprises:

establishing temporary two-way video communication between the third party and the caller.

33. The method of claim 24, wherein accepting comprises:

establishing two-way video communication between the caller and the recipient.

34. A method for screening video communications in an interactive television system, the method comprising:

intercepting a video communication request sent by a caller to a recipient;

identifying the caller using information contained within the video communication request;

determining that the caller is not identified within a unauthorized caller list;

notifying a third party concerning the identity of the caller;

prompting the third party for acceptance or rejection of the video communication request; and accepting the video communication request in response to receiving an indication of acceptance from the third party.

35. The method of claim 34, further comprising:

identifying the recipient using information contained within the video communication request; and notifying the third party concerning the identity of the recipient.

36. The method of claim 34, further comprising:

in response to not receiving an indication acceptance from the third party within an established time interval, rejecting the video communication request.

37. The method of claim 34, further comprising:

in response to receiving an indication of rejection from the third party, rejecting the video communication request.

38. The method of claim 37, further comprising:

adding an Indication of the caller to an unauthorized caller list.

39. The method of claim 34, wherein the recipient and third party are each associated with an interactive television system at a different location.

40. The method of claim 34, wherein the video communication request includes live video of the caller, and wherein notifying comprises:

sending the live video of the caller to the, third party.

41. The method of claim 40, wherein the live video is captured by a video camera integrated with an interaction television system of the caller.

42. The method of claim 34, wherein notifying comprises:

establishing temporary two-way video communication between the third party and the caller.

43. The method of claim 34, wherein the unauthorized caller list is recipient-specific, the method further comprising:

identifying the recipient using information contained within the video communication request; and locating an unauthorized caller list specific to the recipient.

44. A system for screening video communications in an interactive television system, the system comprising:

an interception component configured to intercept is video communication request sent by a caller to a recipient;

an identification component configured to identify the caller using information contained within the video communication request;

a notification component configured to notify a third party concerning the identity of the caller and prompt the third party for acceptance or rejection of the video communication request; and an authorization component configured to acceptance the video communication request in response to receiving an indication of acceptance from the third party.

45. A system for screening video communications in an interactive television system, the system comprising:

an interception component configured to interception video communication request sent by a caller to a recipient;

an identification component configured to identify the caller using information contained within the video communication request;

an authorization component configured determine that the caller is not identified within a unauthorized caller list;

a notification component to notify a third party concerning the identity of the caller and prompt the third party fir acceptance or rejection of the video communication request; and wherein the authorization component is further configured to accept the video communication request in response to receiving an indication of acceptance from the third party.

46. A system for screening video communications in an interactive television system, the system comprising:
    means for intercepting a video communication request sent by a caller to a recipient:
    means for identifying the caller using information contained within the video communication request;
    means for notifying a third party concerning the identity of the caller;
    means for prompting the third party for acceptance or rejection of the video communication request; and
    means for accepting the video communication request in response to receiving an indication of acceptance from the third party.

* * * * *